United States Patent [19]
Ikejima et al.

[11] Patent Number: 5,769,157
[45] Date of Patent: Jun. 23, 1998

[54] HEAT EXCHANGER AND METHOD OF FABRICATING THE HEAT EXCHANGER

[75] Inventors: Kaoru Ikejima; Takashi Gotoh; Tsuneo Yumikura, all of Hyogo; Michimasa Takeshita, Shizuoka; Takayuki Yoshida, Kanagawa, all of Japan

[73] Assignee: Mitsubishi Denki Kabushiki Kaisha, Tokyo, Japan

[21] Appl. No.: 417,159

[22] Filed: Apr. 4, 1995

[30] Foreign Application Priority Data

Jul. 22, 1994 [JP] Japan .................................. 6-171307
Oct. 24, 1994 [JP] Japan .................................. 6-258351

[51] Int. Cl.⁶ .................................. F28F 1/32; F28F 1/36
[52] U.S. Cl. ................. 165/184; 165/171; 165/DIG. 500
[58] Field of Search .................................. 165/150, 151, 165/171, 184

[56] References Cited

U.S. PATENT DOCUMENTS

| | | | |
|---|---|---|---|
| 2,469,635 | 5/1949 | Dalin et al. | 165/171 X |
| 2,620,170 | 12/1952 | Brickman | 165/150 X |
| 4,056,143 | 11/1977 | Martin | 165/176 |

FOREIGN PATENT DOCUMENTS

| | | | |
|---|---|---|---|
| 748 179 A | 6/1933 | France . | |
| 1 017 029 A | 11/1952 | France | 15/2 |
| 2 428 224 A | 1/1980 | France | F28F 1/24 |
| 654 158 C | 12/1937 | Germany . | |
| 3309923 | 9/1984 | Germany | 165/171 |
| 61-153388 | 6/1986 | Japan . | |
| 61-153389 | 7/1986 | Japan . | |
| 5-133691 | 5/1993 | Japan | 165/171 |
| 636 615 | 5/1950 | United Kingdom . | |

OTHER PUBLICATIONS

European Search Report for EP 95 104993.
Patent Abstracts of Japan, vol. 010, No. 357 (M–540), 2 Dec. 1986 & JP 61 153388 A, (Kawasaki Steel Corp.) 12 Jul. 1986.

*Primary Examiner*—Allen J. Flanigan
*Attorney, Agent, or Firm*—Wolf, Greenfield & Sacks, P.C.

[57] ABSTRACT

A heat exchanger for an air conditioner comprises a plurality of heat-transfer tubes arranged in parallel to each other at predetermined intervals, and heat-transfer fins formed by helically winding a plurality of fine wires around the plurality of heat-transfer tubes. Preferably, the heat-transfer tubes are divided into groups of two adjacent heat-transfer tubes ($1a$, $1b$), ($1b$, $1c$), ($1c$, $1d$), . . . , and at least one fine wire fin is wound helically around the two adjacent heat-transfer tubes of each group so that the fine wire fin does not cross other portions of the fine wire fin as viewed along a direction perpendicular to a plane including the axes of the plurality of heat-transfer tubes. When fabricating the heat exchanger, at least either the outer circumferences of the heat-transfer tubes or the outer circumferences of the fine wires are coated with a metal film formed by plating, and then the heat-transfer tubes and the fine wires are interlaced to form a heat exchanging structure. Then, the heat exchanging structure is heated to the melting point of the metal film so that the metal film is melted and the heat-transfer tubes and the fine wires are bonded together by the molten metal film.

8 Claims, 26 Drawing Sheets

HEAT EXCHANGER AND METHOD OF FABRICATING THE HEAT EXCHANGER

BACKGROUND OF THE INVENTION

1. Field of the Invention

The present invention relates to a heat exchanger to be incorporated into an air conditioner of a heat pump system, a freezer or a refrigerator, and a method of fabricating such a heat exchanger.

2. Description of the Prior Art

FIG. 1 is a perspective view of a prior art heat exchanger for an air conditioner, disclosed in Japanese Patent Laid-open (Kokai) No. 61-153388 and FIG. 2 is a sectional view of the heat exchanger of FIG. 1. Referring to FIGS. 1 and 2, the heat exchanger is formed by alternately passing fine wires 2a and 2b, which serve as fins, over and under heat-transfer tubes 1 through which a heat exchanging fluid, such as a cooling medium, flows in the direction of the arrow B so that the fine wire fins 2a and 2b are in close contact with the heat-transfer tubes 1. In this heat exchanger, the thermal contact between the fine wire fins 2a and 2b, and the heat-transfer tubes 1 is secured and the positions of the heat-transfer tubes 1 and the fine wire fins 2a and 2b relative to each other are fixed by alternately passing the fine wire fins 2a and 2b over and under the heat-transfer tubes 1. The heat-transfer tubes 1 are very thin tubes having, for example, an outside diameter in the range of 1 to 2 mm and an inside diameter in the range of 0.7 to 1.7 mm.

In operation, as shown in FIG. 2, a current of an external fluid, for example, air, flowing in the direction of the arrow A (FIG. 1) toward the plurality of parallel heat-transfer tubes 1 threads its way through spaces between the fine wire fins 2a and 2b, exchanging heat with the heat-transfer tubes 1 and the fine wire fins 2a and 2b. The current of the external fluid is disturbed by the fine wires 2, the current of the external fluid falling on the fine wire fins is deflected to right and left as shown by arrows in FIG. 3, and part of the external fluid flows along the fine wire fins and rises along the surfaces of the heat-transfer tubes 1, so that the external fluid is able to be in contact with the heat-transfer tubes 1 for a comparatively long contact time.

When cold water is passed through the heat-transfer tubes 1 of the heat exchanger or a low-temperature cooling medium is evaporated in the heat-transfer tubes 1, air flowing past the heat-transfer tubes 1 is cooled for air cooling. If the air passing by the surfaces of the heat-transfer tubes 1 and the fine wire fins 2a and 2b is cooled to a temperature below the dew point, water droplets form over the surfaces of the heat-transfer tubes 1 and the fine wire fins 2a and 2b. The water droplets flow along the surfaces of the heat-transfer tubes 1 and the fine wire fins 2a and 2b, and drain off from the heat exchanger.

In the heat exchanger of this construction, the contact area in which the fine wire fins 2a and 2b are in contact with the heat-transfer tubes 1 is very small. Therefore, the fine wire fins 2a and 2b do not reduce the contact area in which the external fluid comes into contact with the heat-transfer tubes 1 and hence heat can effectively be transferred between the external fluid and the heat-transfer tubes 1.

Although the heat-transfer rate of this prior art heat exchanger is greater than that of a conventional heat exchanger for air conditioner, the heat-transfer area of the prior art heat exchanger is ⅕ or below that of a conventional heat exchanger having the same front area because the prior art heat exchanger has a very small thickness in the range of 1 to 3 mm. A heat exchanger formed by stacking a plurality of heat exchanging units of the type similar to this prior art heat exchanger may be used to secure a necessary heat exchanging quantity. However, the heat exchanger having the plurality of heat exchanging units increases the pressure loss of air, the flow of air is reduced and, consequently, it is impossible to secure a necessary heat exchanging quantity unless the power of the blower is increased. The heat exchanging ability Q of a heat exchanger is expressed by: Q=K×A×ΔT, where K is the overall heat-transfer coefficient, A is the heat-transfer area and ΔT is the temperature difference between air and the medium flowing through the heat-transfer tubes 1. Since the prior art heat exchanger is constructed by passing the fine wire fins 2a and 2b alternately over and under the heat-transfer tubes 1, it is difficult to increase the heat-transfer area per unit front area and it is difficult to increase the overall heat-transfer coefficient by enhancing the disturbance of the flow of air. After all, it has been impossible to enhance the heat exchanging quantity through the improvement of the factors that contribute to the enhancement of the heat exchanging quantity and there has been a limit to the enhancement of the heat exchanging efficiency.

Such problems are remarkable particularly when the heat exchanger is used as an evaporator and vapor contained in air condenses into water droplets over the heat-transfer surface. If water droplets form over the surfaces of the heat-transfer tubes 1 and the fine wire fins 2a and 2b, the spaces between the fine wire fins 2a and 2b are clogged with the condensation to hinder the flow of air through the heat exchanger. Consequently, the flow of air is reduced due to pressure loss and the reduction of the heat exchanging efficiency results.

It is generally known that, when a nonazeotropic cooling medium is used as a cooling medium which is passed through the heat-transfer tubes, the performance of the heat exchanger formed by arranging a plurality of heat exchanging units in layers is improved considerably when the nonazeotropic cooling medium is passed in a crossflow mode from the rear heat exchanging unit sequentially through the intermediate heat exchanging units toward the front heat exchanging unit so that the heat exchanger functions virtually as a crossflow type heat exchanger. The number of the heat exchanging units of a heat exchanger for the conventional air conditioner is two at the most, because an excessively large number of heat exchanging units increase the thickness of the heat exchanger and the size of the air conditioner increases accordingly. Therefore it has been very difficult to construct a crossflow type heat exchanger capable of functioning virtually as a counterflow type heat exchanger.

In the prior art heat exchanger, since the heat-transfer tubes 1 and the fine wire fins 2a and 2b serving as fins are in simple contact with each other, the contact parts have a high thermal resistance and hence the heat exchanging efficiency of the heat exchanger is comparatively low. The thermal resistance may be reduced by brazing the fine wire fins to the heat-transfer tubes with a Ni hard solder powder or a solder powder. However, since the spaces between the fine wire fins are very narrow, it is highly probable that the spaces are clogged with the hard solder or the solder and the heat exchanger becomes defective. Therefore, there has been a limit to the improvement of the heat exchanging efficiency.

SUMMARY OF THE INVENTION

Accordingly, it is an object of the present invention to provide a heat exchanger for an air conditioner, capable of increasing heat-transfer coefficient outside a heat-transfer tube, of promoting heat transfer and of suppressing reduction in heat exchanging quantity due to reduction in the flow of air.

Another object of the present invention is to provide a heat exchanger for an air conditioner, provided with heat transfer fins having an increased heat-transfer area capable of exchanging heat at an increased heat exchanging quantity, and capable of passing air at a reduced pressure loss and of suppressing reduction in heat exchanging quantity due to reduction in the flow of air.

Further object of the present invention is to provide a heat exchanger for an air conditioner, having an increased heat-transfer area capable of exchanging heat at an increased heat exchanging quantity, and requiring a reduced space for installation.

Still further object of the present invention is to provide a heat exchanger for an air conditioner, capable of increasing heat-transfer coefficient outside a heat-transfer tube and of promoting heat transfer, having an increased heat-transfer area to increase heat exchanging quantity and capable of suppressing reduction in heat exchanging quantity due to reduction in the flow of air and of reducing the pressure loss of air.

Still further object of the present invention is to provide a heat exchanger for an air conditioner, having a simple construction and an increased heat-transfer area, and capable of exchanging heat at an increased heat exchanging quantity and of suppressing reduction in the heat exchanging quantity due to reduction in the flow of air.

Still further object of the present invention is to provide a method of fabricating a heat exchanger for an air conditioner, capable of operating at an increased heat exchanging efficiency.

A heat exchanger for an air conditioner, in accordance with the present invention comprises a plurality of parallel heat-transfer tubes arranged at predetermined intervals, and a plurality of fine wire fins formed by helically winding fine wires around the plurality of heat-transfer tubes. In operation, the external fluid that flows outside the heat-transfer tubes is disturbed three-dimensionally to promote the heat-transfer performance of the fine wire fins on the lower side with respect to the direction of flow of the external fluid. Spaces formed on the flowing path of air between the fine wire fins of the heat exchanger are large because the fine wire fins do not intersect each other in a plane perpendicular to the heat-transfer tubes. Therefore condensed water droplets are hardly able to stay on the heat exchanger, the heat exchanger is hardly clogged with condensed water droplets even if the surface of the heat exchanger is wet during operation, and hence pressure loss is small so that reduction in the heat exchanging quantity due to reduction in the flow of the external fluid can be suppressed.

Preferably, the plurality of heat-transfer tubes are divided into pairs of adjacent heat-transfer tubes, and the fine wire fine is wound around each pair of adjacent heat-transfer tubes. When thus formed, the heat exchanger disturbs the external fluid three-dimensionally to promote the heat-transfer performance of the fine wire fins on the lower side with respect to the flowing direction of the external fluid, and has spaces of an increased area in a plane perpendicular to the heat-transfer tubes. Therefore, condensed water droplets are hardly able to stay on the heat exchanger, the heat exchanger is hardly clogged with condensed water droplets and causes reduced pressure loss even if the surface of the heat exchanger is wet during operation. Accordingly, reduction in heat exchanging quantity due to reduction in the flow of air can be suppressed.

A heat exchanger for an air conditioner, in a preferred mode of the present invention, comprises a plurality of pairs of parallel heat-transfer tubes, the transversely adjacent pairs of heat-transfer tubes being linked, and at least one fine wire fin helically wound around each pair of transversely adjacent heat-transfer tubes so that the fine wire fin does not extend across other fine wire fin as viewed from a direction perpendicular to a plane including the axes of the heat-transfer tubes. When thus formed, the heat exchanger disturbs the flow of an external fluid three-dimensionally to promote the heat transfer performance of the fine wire fins on the lower side with respect to the flowing direction of the external fluid, the fine wire fins do not intersect each other in a plane perpendicular to the heat-transfer tubes, and the heat exchanger has large spaces between the fine wire fins with respect to the flowing direction of air. Therefore, condensed water droplets are hardly able to stay on the heat exchanger, and the heat exchanger is hardly clogged with condensed water droplets even if the surface of the heat exchanger is wet during operation and causes reduced pressure loss. Consequently, reduction in the heat exchanging quantity due to reduction in the flow of air can be suppressed. When the fine wire fins are wound helically around the heat-transfer tubes at a large helical angle, the heat-transfer area of the heat exchanger is greater than that of a heat exchanger formed by arranging heat-transfer tubes at the same pitches and passing fine wire fins alternately over and under the heat-transfer tubes.

Preferably, the fine wire fins forming the heat transfer fins have a polygonal cross section. The fine wire fins having a polygonal cross section have a surface area greater than that of round fine wires and increase the heat exchanging quantity. Since condensed water droplets are able to flow easily along the grooves of the fine wire fins having a polygonal cross section, the heat exchanger is hardly clogged with condensed water droplets even if the surface of the heat exchanger is wet during operation and causes reduced pressure loss. Accordingly, reduction in the heat exchanging quantity due to reduction in the flow of the air can be suppressed.

A heat exchanger for an air conditioner, in a preferred mode of the present invention comprises a plurality of heat-transfer tubes, and a plurality of fine wires helically wound around each heat-transfer tube. A heat-transfer surface including the axis of the heat-transfer tube and the fine wires has a first and a second heat-transfer element extending in the shape of the letter V between the heat-transfer tubes. The first and the second heat-transfer element are arranged along the flowing direction of an external fluid so that the ridge of the V-shaped second heat-transfer element corresponds to the furrow of the V-shaped first heat-transfer element. Thus, the heat exchanger has a large heat-transfer area, which increases the heat exchanging quantity, requires a comparatively small space for installation.

A heat exchanger for an air conditioner, in a preferred mode of the present invention comprises a fin section including a plurality of ring fins which are substantially circular fine wire fins, having a diameter greater than the diameter of the heat-transfer tubes, and fixed to the heat-transfer tube with their inner circumferences in contact with the outer surface of the heat-transfer tube and with their centers dislocated from the axis of the heat-transfer tube toward the upper side with respect to the flowing direction of the external fluid. The heat exchanger has an increased heat-transfer area, the rings disturb the current of the external fluid on the upper side of the heat-transfer tubes so that the external fluid comes into contact with the heat-transfer tubes in turbulent currents, which increases the heat exchanging quantity. Since spaces are formed between the heat-transfer tubes and the ring fins, condensed water droplets are hardly able to stay on the heat exchanger, and the heat exchanger is hardly clogged with condensed water droplets even if the surface of the heat exchanger is wet during operation, so that reduction in the heat exchanging quantity due to reduction in the flow of the external fluid can be suppressed. The two adjacent ring fins may fixedly be joined at least at one position. When the adjacent ring fins are joined together, the heat-transfer surface has a firm construction, the heat-transfer tubes can be arranged at reduced intervals to increase the heat-transfer area.

A heat exchanger for an air conditioner, in a preferred mode of the present invention comprises a fin section including a plurality of first ring fins which are substantially circular fine wire fins, having an inside diameter greater than the outside diameter of the heat-transfer tubes, and fixed to the heat-transfer tube with their inner circumferences in contact with the outer surface of the heat-transfer tube and with their centers dislocated from the axis of the heat-transfer tube toward the upper side with respect to the flowing direction of the external fluid, and a plurality of second fins which are substantially circular fine wire fins, having an inside diameter greater than the outside diameter of the heat-transfer tubes, and fixed to the heat-transfer tube with their inner circumferences in contact with the outer surface of the heat-transfer tube and with their centers dislocated from the axis of the heat-transfer tube toward the lower side with respect to the flowing direction of the external fluid. The ring fins of the first and the second fin sets are arranged alternately along the axis of the heat-transfer tube. The current of the external fluid is disturbed on the upper side of the heat transfer tubes so that the external fluid comes into contact with the heat-transfer tubes in turbulent currents, which increases the heat exchanging quantity. Since spaces are formed between the heat-transfer tubes and the ring fins, condensed water droplets are hardly able to stay on the heat exchanger, and the heat exchanger is hardly clogged with condensed water droplets even if the surface of the heat exchanger is wet during operation, so that reduction in the heat exchanging quantity due to reduction in the flow of the external fluid can be suppressed.

A heat exchanger for an air conditioner, in a preferred mode of the present invention comprises ring fins of a fine wire each put on a plurality of heat-transfer tubes with its inner circumference attached to those heat-transfer tubes. The heat exchanger thus constructed has a firm heat-transfer surface, a simple construction and a large heat-transfer area in the flowing direction of an external fluid. Therefore the heat exchanging quantity can be increased. Since spaces are formed between each ring fin and the heat-transfer tube attached to the inner circumference of the ring fin, condensed water droplets are hardly able to stay on the heat exchanger, the heat exchanger is hardly clogged with water droplets even if the surface of the heat exchanger is wet during operation, and reduction in the heat exchanging quantity due to reduction in the flow of the external fluid can be suppressed.

A heat exchanger for an air conditioner, in a preferred mode of the present invention comprises 8-shaped fins each having two loops, formed by bending a fine wire in the shape of the digit "8". One of the loops of each 8-shaped fin is put on each heat-transfer tube. The heat exchanger has an increased heat-transfer area. The 8-shaped fins further disturbs the turbulent currents of an external fluid three-dimensionally to promote heat-transfer efficiency on the lower side. One of the loops of each 8-shaped fin may be put on and fixed to a plurality of heat-transfer tubes, which forms a firm heat-transfer surface of a simple construction having an increased heat-transfer area in the flowing direction of the external fluid and increases the heat exchanging quantity. Since spaces are formed between the 8-shaped fins and the heat-transfer tubes, condensed water droplets are hardly able to stay on the heat exchanger, the heat exchanger is hardly clogged with condensed water droplets even if the heat exchanger is wet during operation, and reduction in the heat exchanging quantity due to reduction in the flow of the external fluid can be suppressed.

A heat exchanger for an air conditioner, in a preferred mode of the present invention comprises a fin section including a coil-shaped fins formed by helically combining ring fins at a pitch twice the diameter of the fine wire or above. The fin can easily be mounted around the heat-transfer tube, and the heat exchanger has a simple construction and an increased heat-transfer area. The centers of the ring fins are dislocated from the axis of the heat-transfer tube toward the upper side with respect to the flowing direction of an external fluid to disturb the current of the external fluid on the upper side of the heat-transfer tubes so that the turbulent currents of the external fluid come into contact with the heat-transfer tubes, which increases the heat exchanging quantity. Since spaces are formed between the ring fins and the heat-transfer tubes, condensed water droplets are hardly able to stay on the heat exchanger and the heat exchanger is hardly clogged with condensed water droplets even if the surface of the heat exchanging unit is wet during operation, and reduction in the heat exchanging quantity due to reduction in the flow of the external fluid can be suppressed. Each coil-shaped fin on one heat-transfer tube may fixedly be joined at least at one point to the fin on the adjacent heat-transfer tube. The heat exchanger has a firm heat-transfer surface. Since the heat-transfer tubes can be arranged at small intervals, the heat exchanger has a simple construction and a large heat-transfer area. The heat exchanger may be provided further with second coil-shaped fin having a plurality of ring fins. The current of the external fluid is disturbed on the upper side of the heat exchanger and the turbulent currents of the external fluid come into contact with the heat-transfer tubes and hence the heat exchanging quantity can be increased.

In a heat exchanger in a preferred mode of the present invention, a plurality of heat-transfer tubes are attached to the inner surface of each coil-shaped fin.

In a heat exchanger in a preferred mode of the present invention, ring fins are attached fixedly to heat-transfer tubes so as to extend obliquely downward. The ring fins extending obliquely downward facilitate condensed water droplets dropping by gravity when the heat exchanger is used in a moist atmosphere where moisture contained in the atmosphere condenses, the heat exchanger is hardly clogged with condensed water droplets even if the surface of the heat exchanger is wet during operation, and reduction in the heat exchanging quantity due to reduction in the flow of the external fluid can be suppressed.

A heat exchanger for an air conditioner, in a preferred mode of the present invention comprises a plurality of parallel heat-transfer tubes arranged at predetermined intervals, fine wires serving as heat transfer fins and passed alternately over and under the heat-transfer tubes so as to form a heat-transfer surface of a plain weave together with the heat-transfer tubes, and fine wire pillars inserted in the heat-transfer surface defined by the heat-transfer tubes and the fine wires. The intervals between the fine wires passed alternately over and under the heat-transfer tubes are at least twice the diameter of the fine wires. The fine wire pillars are joined fixedly at least to either the fine wires or the heat-transfer tubes. The heat exchanger thus constructed has an increased heat-transfer area in the flowing direction of air. Since the fine wire fins are arranged at comparatively large intervals, condensed water droplets are hardly able to stay on the heat exchanger, the heat exchanger is hardly clogged with condensed water droplets even if the surface of the heat exchanger is wet during operation, and reduction in the heat exchanging quantity due to reduction in the flow of air can be suppressed. Preferably, the second fine wires are bent in the shape of the inverted letter V so that the opposite sides of each second fine wire extend obliquely downward. This construction promotes condensed water droplets falling by gravity when the heat exchanger is used in a moist atmosphere where moisture contained in the atmosphere condenses. The heat exchanger is hardly clogged with water droplets even if the surface of the heat exchanger is wet during operation, and reduction in the heat exchanging quantity due to reduction in the flow of the external fluid can be suppressed.

A heat exchanger for an air conditioner, in a preferred mode of the present invention comprises a plurality of heat-transfer tubes through which a nonazeotropic cooling medium flows, a plurality of fine wires, and a plurality of heat-transfer members arranged perpendicularly to the flowing direction of an external fluid in a plurality of banks and parallel to each other, and connected to each other. The cooling medium is supplied so as to flow from the heat-transfer member disposed at the lowermost position with respect to the flow of the external fluid through the heat-transfer tubes toward the heat-transfer member disposed at the uppermost position. The heat exchanging performance of this heat exchanger is higher than that of a heat exchanger of a simple crossflow type (a heat exchanger with a single crossflow heat exchanging unit).

A heat exchanger for an air conditioner, in a preferred mode of the present invention comprises a plurality of parallel heat-transfer tubes arranged at predetermined intervals to pass a cooling medium therethrough, and a plurality of bar fins, arranged on each heat-transfer tube along its axis, inclined to a plane including the axes of the plurality of heat-transfer tubes, and placed in contact with the surface on the upper side with respect to the flowing direction of an external fluid of the heat-transfer tube and in contact with the surface on the lower side with respect to the flowing direction of the external fluid of the adjacent heat-transfer tube. The two axially adjacent bar fins on each heat-transfer tube extend in different directions and in contact with the adjacent heat-transfer tubes respectively. When air flows through the heat exchanger, the bar fins generate vortices and disturbs the currents of air to promote heat transfer. Since the length of the bar fins may optionally be determined to increase the fin area, a necessary heat-transfer area can easily be secured.

The heat exchanger may further be provided with a plurality of other heat-transfer tubes placed in spaces between the bar fins extending in different directions between the adjacent heat-transfer tubes so as to be in contact with the bar fins. The additional heat-transfer tubes improves fin efficiency and heat-transfer performance.

Preferably, a plurality of parallel first bar fins are arranged obliquely, a plurality of parallel second bar fins are arranged obliquely in contact with the first bar fins in a mirror image relation with the first bar fins, and a plurality of heat-transfer tubes are inserted in a plurality of rhombic spaces defined by the first and the second bar fins so as to be in contact with the bar fins defining the rhombic spaces. This construction promotes heat transfer more effectively and can easily be fabricated.

A heat exchanger for an air conditioner, in a preferred mode of the present invention comprises a plurality of parallel heat-transfer tubes, through which a cooling medium flows, arranged at predetermined intervals, and a plurality of U- or H-shaped fins arranged at predetermined intervals on the heat-transfer tubes along the axes of the heat-transfer tubes so as to clasp the heat-transfer tubes respectively. The alternate fins are aligned with different directions. Since the size of the fins can optionally be determined, a necessary heat-transfer area can readily be secured. The ends of the U- or H-shaped fins may extend obliquely downward to facilitate condensed water droplets falling down, to prevent the air passages being clogged with condensed water droplets, and to promote heat transfer.

A heat exchanger for an air conditioner, in a preferred mode of the present invention comprises a plurality of parallel heat-transfer tubes, through which a cooling medium flows, arranged at predetermined intervals, and ring-shaped fins each having a central through hole to receive the heat-transfer tube therein such that the ring-shaped fin is in contact with the outer surface of the heat-transfer tube. The size of the ring-shaped fin is determined selectively to secure a desired heat-transfer area. Preferably, the heat-transfer tubes are arranged so that the ring-shaped fins attached to the adjacent heat-transfer tubes overlap each other, and a plurality of bars or tubes are inserted in spaces defined by overlapping ring-shaped fins and the overlapping ring-shaped fins are pulled away from each other so that the bar or the tube, and the heat-transfer tubes are in close contact with the ring-shaped fins. This construction secures a large heat-transfer area without reducing the effect of promoting heat transfer. Since the adjacent heat-transfer tubes are pulled away from each other to tighten the ring-shaped fins, the heat-transfer tubes and the ring-shaped fins can be held in satisfactory thermal contact and the heat-transfer tubes can be arranged at fixed pitches.

A heat exchanger for an air conditioner, in a preferred mode of the present invention comprises a plurality of parallel heat-transfer tubes, through which a cooling medium flows, arranged at predetermined intervals, and a pair of wire fins disposed on the opposite sides of each heat-transfer tube. The end portions of the wire fins are intertwisted to tension the wire fins so that the wire fins are in contact with the heat-transfer tube. The wire fins promotes heat transfer, and the length of the wire fins is determined selectively to secure a necessary heat-transfer area.

Preferably, the fins and the heat-transfer tubes are formed of materials having different contact angles respectively. Condensed water droplets are attracted to either of the fins or the heat-transfer tubes, having a smaller contact angle, so that condensed water drops drain off easily from the heat exchanger. Consequently, condensed water droplets are hardly retained between the fins and hence the heat-transfer ability of the heat exchanger is not reduced when moisture condenses over the heat exchanger. The respective surfaces of the fins and the heat-transfer tubes may be coated with materials having different contact angles respectively for the same purpose and effect.

A heat exchanger for an air conditioner, in a preferred mode of the present invention comprises a plurality of parallel heat-transfer tubes, through which a cooling medium flows, arranged at predetermined intervals, and a plurality of support bars extended in parallel to the heat-transfer tubes at predetermined intervals equal to those of the heat-transfer tubes in a staggered relation with the heat-transfer tubes in planes extending in parallel to and on the opposite sides of a plane including the axes of the heat-transfer tubes at a predetermined distance from the heat-transfer surface. The plurality of heat-transfer tubes and the plurality of support bars on one side of the heat-transfer surface are interconnected by first fine wire fins, the plurality of heat-transfer tubes and the plurality of support bars on the other side of the heat-transfer surface are interconnected by second fine wire fins, and the first and the second fine wire fins are arranged alternately along the axes of the heat-transfer tubes. Since the support bars and the fine wire fins are interlaced, the fine wire fins cross each other at a large angle as viewed in a plane perpendicular to the heat-transfer tubes. Therefore, condensed water droplets are hardly able to stay on the heat exchanger, the heat exchanger is hardly clogged with condensed water droplets even if the surface of the heat exchanger is wet during operation, and reduction in the heat exchanging quantity due to reduction in the flow of air can be suppressed. The support bars may be substituted by heat-transfer tubes equal to or different from the heat-transfer tubes in diameter. When thus constructed, the heat exchanging efficiency of the fins is improved and heat transfer is promoted. Preferably, the heat exchanger is provided with headers disposed on the heat-transfer surfaces of the plurality of heat-transfer tubes and joined to the opposite ends of the heat-transfer tubes respectively, and the support bars are fixed to the headers. The cooling medium is distributed to the heat-transfer tubes by the header. Since the support bars are fixed to the headers, the support bars will not be dislocated by the tension of the fine wire fins.

A heat exchanger for an air conditioner, in a preferred mode of the present invention comprises a plurality of parallel first heat-transfer tubes, through which a cooling medium flows, arranged at predetermined intervals, a plurality of parallel second heat-transfer tubes and a plurality of parallel third heat-transfer tubes extended in parallel to the first heat-transfer tubes at predetermined intervals equal to those of the first heat-transfer tubes in a staggered relation with the first heat-transfer tubes in planes extending in parallel to and on the opposite sides of a plane including the axes of the first heat-transfer tubes at a predetermined distance from the heat-transfer surface, and a plurality of support bars extended in a space between the first and the second heat-transfer tubes and a space between the first and the third heat-transfer tubes in parallel to the heat-transfer surface and perpendicularly to the heat-transfer tubes. The first and the second heat-transfer tubes are interconnected by a plurality of fine wire fins, the first and the third heat-transfer tubes are interconnected by a plurality of second fine wire fins, and the first and the second fine wire fins are arranged alternately on the heat-transfer tubes along the axes of the heat-transfer tubes. Since the heat exchanger is provided with the second and the third heat-transfer tubes and the support bars, the fine wire fins cross each other at a large angle as viewed in a plane perpendicular to the heat-transfer tubes. Therefore, condensed water drops are hardly able to stay on the heat exchanger, the heat exchanger is hardly clogged with condensed water drops even if the surface of the heat exchanger is wet during operation and hence reduction in the heat exchanging quantity due to reduction in the flow of air can be suppressed. The support bars hold the heat-transfer tubes firmly in place and strengthen the heat exchanger.

A heat exchanger for an air conditioner, in a preferred mode of the present invention comprises a plurality of parallel first heat-transfer tubes, through which a cooling medium flows, arranged at predetermined intervals, and fine wire fins wound around at least the two adjacent heat-transfer tubes so as to be in contact with the surface of the heat-transfer tube on either the upper side or the lower side with respect to the flowing direction of a fluid that flows perpendicularly to a plane including the axes of the heat-transfer tubes. Since the fine wire fin is wound around a group of an optional number of heat-transfer tubes, the fine wire fins intersect each other at a reduced number of points as viewed in a plane perpendicular to the heat-transfer tubes. Therefore, condensed water droplets are hardly able to stay on the heat exchanger, the heat exchanger is hardly clogged with condensed water drops even if the surface of the heat exchanger is wet during operation and reduction in the heat exchanging quantity due to reduction in the flow of air can be suppressed.

The heat-transfer tubes may be flat tubes. When flat heat-transfer tubes are employed, the fine wire fins extend at a large angle to the heat-transfer tube. Therefore, condensed water droplets are hardly able to stay on the heat exchanger, the heat exchanger is hardly clogged with condensed water droplet even if the surface of the heat exchanger is wet during operation and reduction in the heat exchanging quantity due to reduction in the flow of air can be suppressed. Preferably, the fine wire fins are tightened so that they are in close contact with the heat-transfer tubes to reduce thermal resistance at the contact points. The heat-transfer tubes may be formed of a soft material. When heat-transfer tubes formed of a soft material are employed, the taught fine wire fins will sink in the surfaces of the heat-transfer tubes and held in close contact with the heat-transfer tubes, so that the thermal resistance between the heat-transfer tubes and the fine wire fins is reduced and heat transfer is promoted.

Preferably, the heat-transfer tubes are provided in their surfaces with recesses to receive the fine wire fins therein. The recesses facilitates the fixation of the fine wire fins to the heat-transfer tubes and reduces thermal resistance between the heat-transfer tubes and the fine wire fins.

A heat exchanger for an air conditioner, in a preferred mode of the present invention has a heat-transfer surface having a wavy cross section. The cross section of the heat-transfer surface may be curved in a semicircular shape. When the heat-transfer surface is thus curved, the ratio of the heat-transfer area to the frontal area increases.

A heat exchanger for an air conditioner, in a preferred mode of the present invention comprises a plate fin-tube heat exchanging unit formed by arranging a plurality of plate fins in parallel to each other at predetermined intervals and extending a plurality of heat-transfer tubes, through which a cooling medium flows, through the plurality of plate fins perpendicularly to the surface of the plate fins and in parallel to each other at predetermined intervals, and a fine wire fin weaving heat exchanging unit formed by arranging a plurality of parallel heat-transfer tubes, through which a cooling medium flows, at predetermined intervals on the lower side of the plate fin-tube heat exchanging unit and weaving a plurality of fine wire fins around the plurality of heat-transfer tubes so as to be in close contact with the heat-transfer tubes. The ratio of heat-transfer area to frontal area of this heat exchanger is greater than that of a heat exchanger comprising two sets of fine wire fin heat exchanging units in two banks. When the heat exchanger is used in a humid atmosphere where moisture contained in the atmosphere is liable to condense into water droplets, moisture condenses mainly on the plate fins on the upper side to prevent clogging the heat exchanging unit on the lower side with condensed water droplets.

A heat exchanger for an air conditioner, in a preferred mode of the present invention comprises a corrugated-fin-tube heat exchanging unit comprising flat heat-transfer tubes and corrugated fins attached to the heat-transfer tubes, and a fine wire fin weaving heat exchanging unit disposed on the lower side of the corrugated-fin-tube heat exchanging unit and comprising a plurality of parallel heat-transfer tubes, through which a cooling medium flows, arranged at predetermined intervals and a plurality of fine wire fins weaved around the heat-transfer tubes so as to be in close contact with the latter. The ratio of heat-transfer area to frontal area of the heat exchanger is greater than a heat exchanger formed by arranging two fine wire fin heat exchanging units in two banks. When the heat exchanger is used in a highly humid atmosphere where moisture contained in the atmosphere is liable to condense into water droplets, moisture condenses mainly on the corrugated-fin-tube heat exchanging unit disposed on the upper side to prevent clogging the heat exchanging unit on the lower side with condensed water droplets.

A method of fabricating a heat exchanger for an air conditioner, in accordance with the present invention comprises steps of coating at least either the surfaces of a plurality of heat-transfer tubes or those of fine wire heat transfer fins with a metal film by plating, combining the plurality of heat-transfer tubes and the fine wire fins, heating the combination of the heat-transfer tubes and the fine wire fins to a melting point of the metal film so that the metal film is partly melted to bond together the plurality of heat-transfer tubes and the fine wire fins. Since the heat-transfer tubes and the fine wire fins are bonded together by melting and solidifying the metal film, the thermal resistance at the junctions of the heat-transfer tubes and the fine wire fins is small and heat-transfer efficiency is improved. Since the thickness of the metal film can be determined by regulating the plating time, spaces between the fine wire fins will not be filled up with the molten metal film and the heat-transfer tubes and the fine wire fins can precisely be bonded together. The heat-transfer tubes and the fine wire fins may be plated with Ni or a solder.

The heat exchanger may be provided with metal nets disposed on the upper side and the lower side of the row of the plurality of heat-transfer tubes instead of the fine wire fins. A metal net may be passed alternately over and under the plurality of heat-transfer tubes instead of using the fine wire fins. The thermal resistance at the joints of the heat-transfer tubes and the fine wire fins is reduced, heat-transfer efficiency is improved, the heat exchanger can be manufactured at a reduced cost.

The above and other objects, features and advantages of the present invention will become more apparent from the following description taken in connection with the accompanying drawings.

DETAILED DESCRIPTION OF THE PREFERRED EMBODIMENTS

Figure 4:
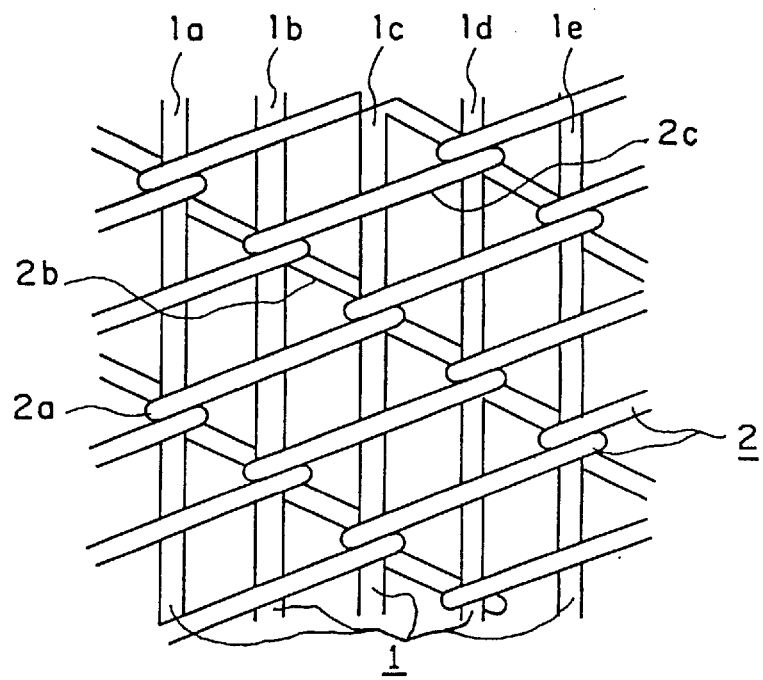
FIG. 4 is a fragmentary plan view of the heat transfer plane of a heat exchanger for an air conditioner in a first embodiment according to the present invention.

Referring to FIG. 4 showing an essential part of a heat exchanger for an air conditioner, in a first embodiment according to the present invention in a fragmentary plan view, heat-transfer tubes 1 and 1a to 1e are arranged at predetermined intervals to pass an internal fluid, such as a cooling medium. Portions 2a to 2c of a fine wire fin realize heat transfer fins. The portion 2a of the fine wire fin is wound helically around the heat-transfer tubes 1a and 1c, the portion 2b of the fine wire fin is wound helically around the heat-transfer tubes 1b and 1c, and the portion 2c of the fine wire fin is wound helically around the heat-transfer tubes 1b and 1d. The portions 2a, 2c of the fine wire fin are extended on the upper side with respect to the flowing direction of an external fluid, such as air, and the portion 2b of the fine wire fin is extended on the lower side with respect to the flowing direction of the external fluid.

In operation, the air flow velocity increases in spaces between the fine wire fins 2 and the fine wire fins 2 disturb the currents of air three-dimensionally. Consequently, the turbulent currents of the air flow through the heat exchanger, promoting heat transfer, so that the heat exchanger transfers heat at a high heat transfer rate. Since the plurality of fine wire fins 2 are wound helically around the plurality of parallel heat-transfer tubes 1, wide spaces are formed between the fine wire fins 2 and the fine wire fins 2 obstruct scarcely the flow of condensed water droplets axially downward along the heat-transfer tubes 1. Accordingly, condensed water droplets are hardly able to stay on the heat exchanger. Therefore, condensed water droplets are hardly able to stay on the heat exchanger, the heat exchanger is hardly clogged with condensed water droplets even if the heat exchanger is used in a moist atmosphere where moisture contained in the atmosphere is liable to condense, so that reduction in heat exchanging quantity due to reduction in the flow of the external fluid can be suppressed.

Figure 5:
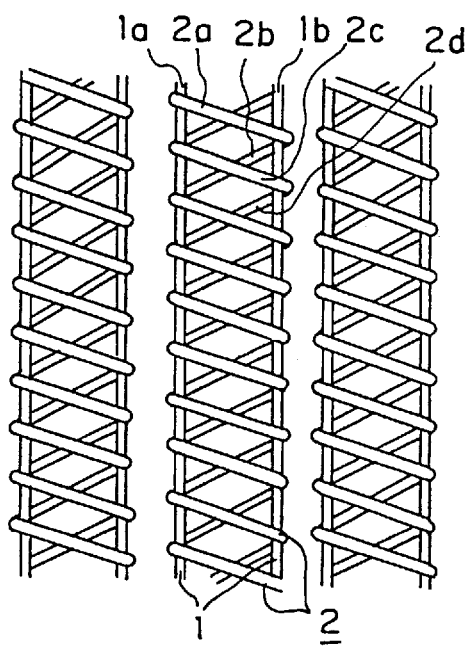
FIG. 5 is a fragmentary plan view of the heat transfer plane of a heat exchanger for an air conditioner in a second embodiment according to the present invention.

Referring to FIG. 5 showing a main portion of a heat exchanger for an air conditioner, in a second embodiment according to the present invention in a fragmentary plan view, a plurality of pairs of heat-transfer tubes 1a and 1b are a pair of adjacent tubes among heat-transfer tubes 1 arranged at predetermined intervals to pass an internal fluid, such as a cooling medium. Portions 2a to 2d of fine wire fins as heat transfer fins are wound helically around each pair of heat-transfer tubes 1a and 1b. The portions 2a, 2b are of a fine wire fin, and the portions 2c and 2d are of another fine wire fin. The portions 2a, 2c are on the upper side with respect to the flowing direction of an external fluid, such as air, and the portions 2b, 2d are on the lower side with respect to the flowing direction of the external fluid.

In operation, the air flow velocity increases in spaces between the fine wire fins 2 and the fine wire fins 2 disturb the currents of air three-dimensionally. Consequently, the turbulent currents of the air flow through the heat exchanger, promoting heat transfer, so that the heat exchanger transfers heat at a high heat-transfer rate. Since the fine wire fins 2 are wound around the pair of adjacent heat-transfer tubes 1 to form the heat transfer fins, spaces having a large area are formed in a plane perpendicular to the heat-transfer tubes 1. Therefore, condensed water droplets are hardly able to stay on the heat exchanger. Consequently, the heat exchanger is hardly clogged with condensed water droplets even if the heat exchanger is used in a humid atmosphere where moisture contained in the atmosphere is liable to condense and reduction in heat exchanging quantity due to reduction in the flow of the air can be suppressed.

Figure 6:
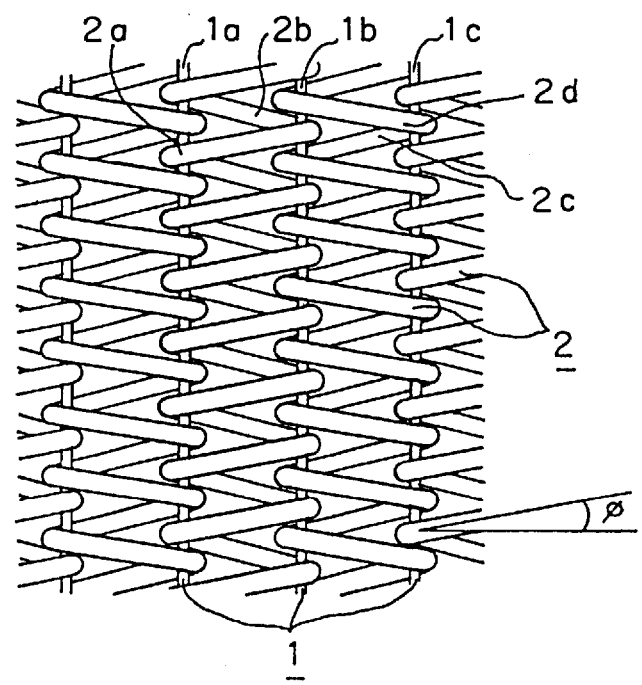
FIG. 6 is a fragmentary plan view of the heat transfer plane of a heat exchanger for an air conditioner in a third embodiment according to the present invention.

Referring to FIG. 6 showing a heat exchanger for an air conditioner, in a third embodiment according to the present invention in a fragmentary plan view, heat-transfer tubes 1 and 1a to 1c are arranged at predetermined intervals to pass an internal fluid, such as a cooling medium. Portions 2a, 2b are of a fine wire fins. Portions 2c, 2d are of another fine wire fins. The portions 2a, 2b of the fine wire fin are wound helically around the heat-transfer tubes 1a and 1b, and the portions 2c, 2d of the another fine wire fin are wound around the 1b and 1c. The portions 2a and 2b, and the portions 2c, 2d are wound helically around the heat-transfer tubes 1a and 1b and around the heat-transfer tubes 1b and 1c in opposite directions respectively. The portions 2a and 2d are on the upper side with respect to the flowing direction of an external fluid, such as air, and the portions 2b and 2c are on the lower side with respect to the flowing direction of the external fluid.

Figure 7:
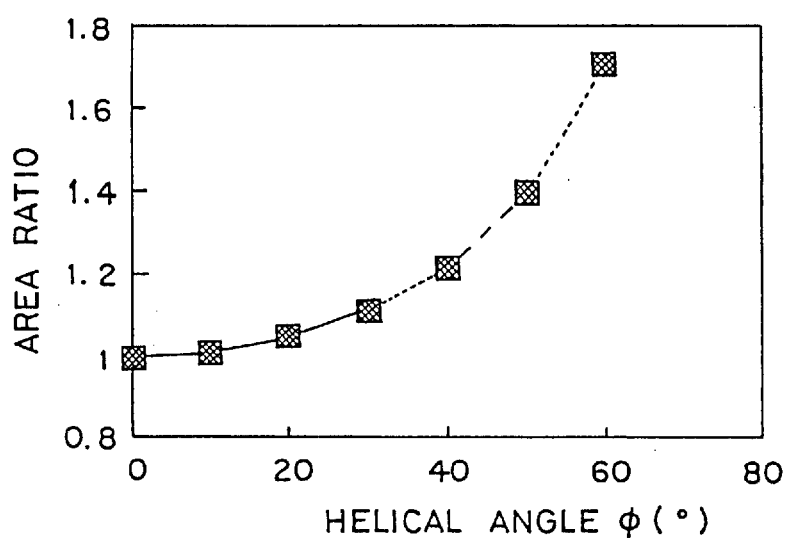
FIG. 7 is a graph showing the dependence of the area ratio on the helical angle of fine wire fins of the heat exchanger of the third embodiment.

In operation, the air flow velocity increases in spaces between the fine wire fins 2 and the fine wire fins 2 disturb the currents of air three-dimensionally. Consequently, the turbulent currents of air through the heat exchanger, promoting heat transfer, so that the heat exchanger transfers heat at a high heat-transfer rate. As shown in FIG. 6, since the fine wire fins 2 do not cross each other in a plane perpendicular to the heat-transfer tubes 1, i.e., since the fine wires are wound helically around the heat-transfer tubes 1 so that fine wire fin 2 does not cross the fine wire fin of the same fine wire and the fine wire fins 2 of the other fine wire as viewed along the axes of the transfer tubes 1, spaces having a large area are formed between the fine wire fins 2 and the fine wire fins 2 obstruct scarcely the flow of condensed water droplets axially downward along the heat-transfer tubes 1, condensed water droplets are hardly able to stay on the heat exchanger. Therefore, the heat exchanger is hardly clogged with condensed water droplets even if the heat exchanger is used in a moist atmosphere where moisture contained in the atmosphere condenses in water droplets, and reduction in heat exchanging quantity due to reduction in the flow of the air can be suppressed. As is obvious from FIG. 7 showing the relationship between the area ratio and the helical angle φ (see FIG. 6), it is established by increasing the helical angle φ that the heat transfer area increases as compared with a conventional heat transfer fin where fine wire fins are linearly arranged on a heat transfer tube under the condition that the arranged wire pitches are same.

Figure 8:
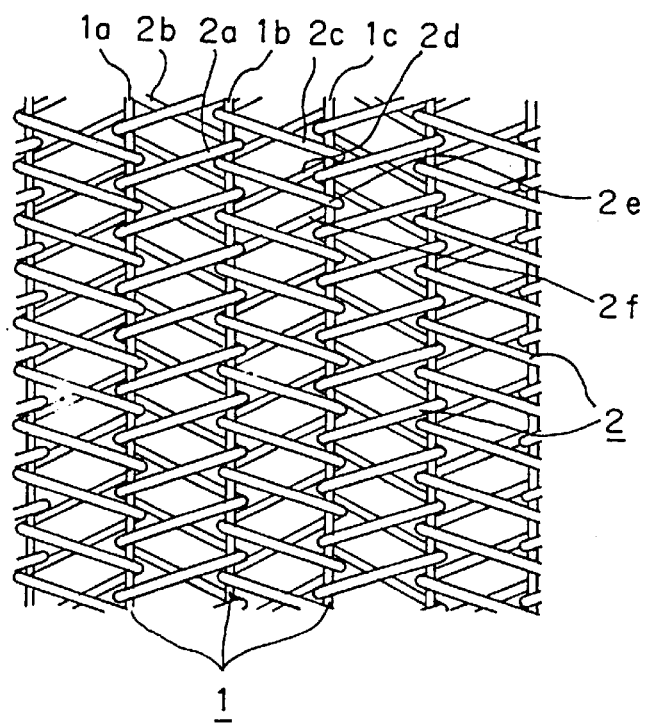
FIG. 8 is a fragmentary plan view of the heat transfer plane of a heat exchanger for an air conditioner in a fourth embodiment according to the present invention.

Referring to FIG. 8 showing a heat exchanger for an air conditioner, in a fourth embodiment according to the present invention in a fragmentary plan view, heat-transfer tubes 1a to 1c are arranged at predetermined intervals to pass an internal fluid, such as a cooling medium. Portions 2a to 2f of fine wire fins 2 realize heat transfer fins. The portions 2a, 2b are of a fine wire fin. The portions 2c, 2d are of another fine wire fin. The portions 2e, 2f are of still another fine wire fin. The portions 2a, 2b are wound helically around the heat-transfer tubes 1a and 1b. The portions 2c, 2d and 2e, 2f are wound helically around the heat-transfer tubes 1b and 1c. The portions 2c, 2d are located between pitches of the portion 2e, 2f. The winding direction of the fine wire forming the portions 2c and 2d is opposite that of the fine wire forming the portions 2a and 2b. The portions 2a, 2c and 2e are on the upper side with respect to the flowing direction of an external fluid, such as air, and the portions 2b, 2d and 2f are on the lower side with respect to the flowing direction of the external fluid.

In operation, the air flow velocity increases in spaces between the fine wire fins 2 and the fine wire fins 2 disturbers the currents of the air three-dimensionally. Consequently, the turbulent currents of the air flow through the heat exchanger, promoting heat transfer, so that the heat exchanger transfers heat at a high heat-transfer rate. Since the fine wires are wound helically around the heat-transfer tubes 1 to form the helical fine wire fins 2, the fine wire fins 2 do not cross each other in a plane perpendicular to the heat-transfer tubes 1, spaces of a large area are formed between the fine wire fins 2, and the fine wire fins 2 obstruct scarcely the flow of condensed water droplets axially downward along the heat-transfer tubes 1. Therefore, condensed water droplets are hardly able to stay on the heat exchanger even if the heat exchanger is used in a moist atmosphere where moisture contained in the atmosphere condenses in water droplets, the heat exchanger is hardly clogged with condensed water droplets and reduction in heat exchanging quantity due to reduction in the flow of the air can be suppressed. The area ratio of the heat exchanger increases from 1 when the helical angle of the fine wire fins 2 is increased from 0 with the pitch fixed.

Figure 9:
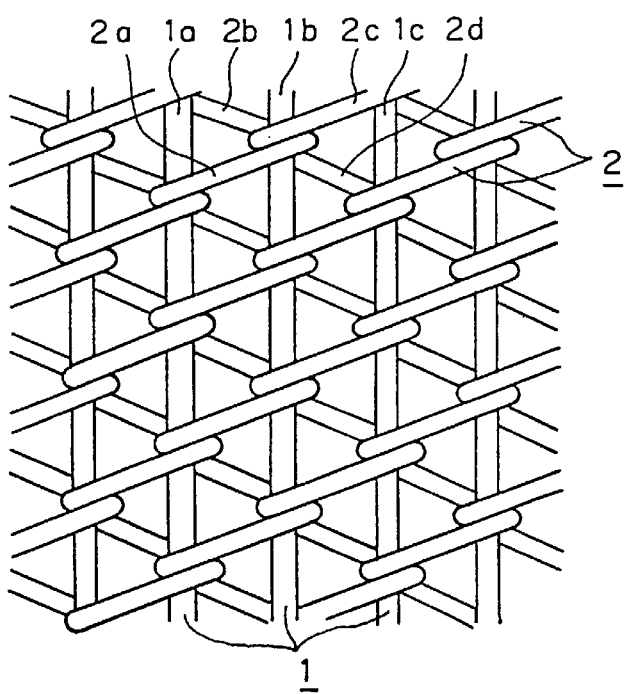
FIG. 9 is a fragmentary plan view of the heat transfer plane of a heat exchanger for an air conditioner in a fifth embodiment according to the present invention.

Referring to FIG. 9 showing a heat exchanger for an air conditioner, in a fifth embodiment according to the present invention in a fragmentary plan view, heat-transfer tubes 1a to 1c are arranged at predetermined intervals to flow an internal fluid, such as a cooling medium. Portions 2a to 2f of fine wire fins 2 realize heat transfer fins. The portions 2a, 2b are of a fine wire fin. The portions 2c, 2d are of another fine wire fin. The portions 2a, 2b are wound helically around the heat-transfer tubes 1a and 1b. The portions 2c, 2d are wound helically around the heat-transfer tubes 1b and 1c. The winding direction of the fine wire forming the portions 2a and 2b is the same as that of the fine wire forming the portions 2c and 2d. The portions may be wound so that the bends between the portions 2a and 2b and those between the portions 2c and 2d are contiguous with each other on the heat-transfer tube 1b to form large spaces surrounded by the helical fine wire fins 2 and the heat-transfer tubes 1 for passing an external fluid, such as air. The portions 2a and 2c are on the upper side with respect to the flowing direction of the external fluid and the portions 2b and 2d are on the lower side with respect to the flowing direction of the external fluid.

In operation, the air flow velocity increases in the spaces between the fine wire fins 2 and the fine wire fins 2 disturb the currents of the air three-dimensionally. Consequently, the turbulent currents of the external fluid promote heat transfer and the heat exchanger transfers heat at a high heat transfer rate. Since the fine wires are wound helically around the heat-transfer tubes 1 so that the fine wire fins 2 do not cross each other in a plane perpendicular to the axes of the heat-transfer tubes 1, the spaces between the fine wire fins 2 are large, the fine wire fins 2 obstruct scarcely the flow of condensed water droplets axially downward along the heat-transfer tubes 1. Therefore, condensed water droplets are hardly able to stay on the heat exchanger, the heat exchanger is hardly clogged with condensed water droplets even if the heat exchanger is used in a moist atmosphere where moisture contained in the atmosphere condenses in water droplets, and reduction in heat exchanging quantity due to reduction in the flow of the air can be suppressed. The area ratio of the heat exchanger increases when the helical angle is increased with the pitch fixed.

Figure 10:
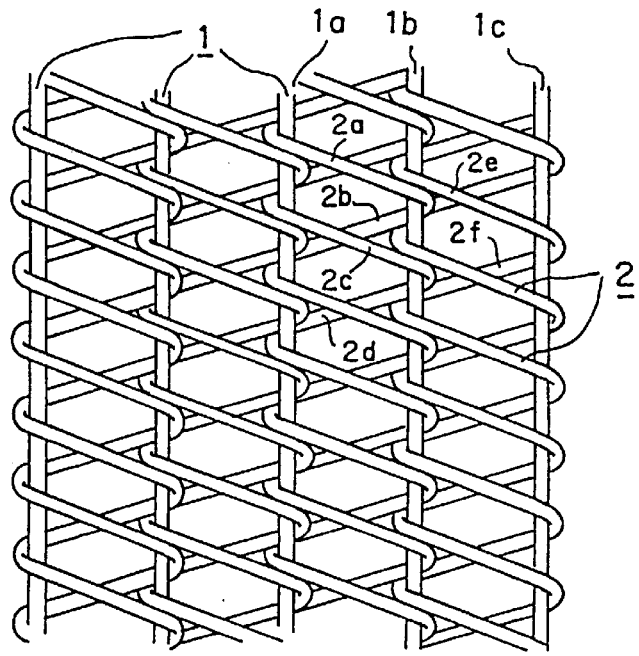
FIG. 10 is a fragmentary plan view of the heat transfer plane of a heat exchanger for an air conditioner in a sixth embodiment according to the present invention.

Referring to FIG. 10 showing a heat exchanger for an air conditioner, in a sixth embodiment according to the present invention in a fragmentary plan view, heat-transfer tubes 1a to 1c are arranged at predetermined intervals to pass an internal fluid, such as a cooling medium. Portions 2a to 2f of fine wire fins 2 realize heat transfer fins. The portions 2a, 2b are of a fine wire fin. The portions 2c, 2d are of another fine wire fin. The portions 2e, 2f are of still another fine wire fin. The portions 2a, 2b and 2c, 2d are wound helically around the heat-transfer tubes 1a and 1b. The portions 2e, 2f are wound helically around the heat-transfer tubes 1b and 1c. The portions 2a, 2b are located between pitches of the portion 2c, 2d. The winding direction of the fine wire forming the portions 2a and 2b is opposite that of the fine wire forming the portions 2e and 2f.

The portions 2a and 2e are contiguous on the heat-transfer tube 1b. Thus, large spaces are formed between the helical fine wire fins 2 and the heat-transfer tubes 1 to pass an external fluid, such as air. The portions 2a, 2c and 2e are on the upper side with respect to the flowing direction of the external fluid and the portions 2b, 2d and 2f are on the lower side with respect to the flowing direction of the external fluid.

The air flow velocity increases in the spaces between the fine wire fins 2 and the fine wire fins 2 disturb the currents of the air three-dimensionally. Consequently, the turbulent currents of the air promotes heat transfer and the heat exchanger transfers heat at a high heat transfer rate. Since the fine wires are wound helically so that the fine wire fins 2 do not cross each other in a plane perpendicular to the axes of the heat-transfer tubes 1, the spaces between the fine wire fins 2 for passing the air are large and the fine wire fins 2 obstruct scarcely the flow of condensed water droplets axially downward along the heat-transfer tubes 1. Therefore, condensed water drops are hardly able to stay on the heat exchanger even if the heat exchanger is used in a moist atmosphere where moisture contained in the atmosphere condenses in water droplets, the heat exchanger is hardly clogged with condensed water droplets and reduction in heat exchanging quantity due to reduction in the flow of the air can be suppressed. The area ratio of the heat exchanger increases when the helical angle is increased with the pitch fixed.

Figure 11:
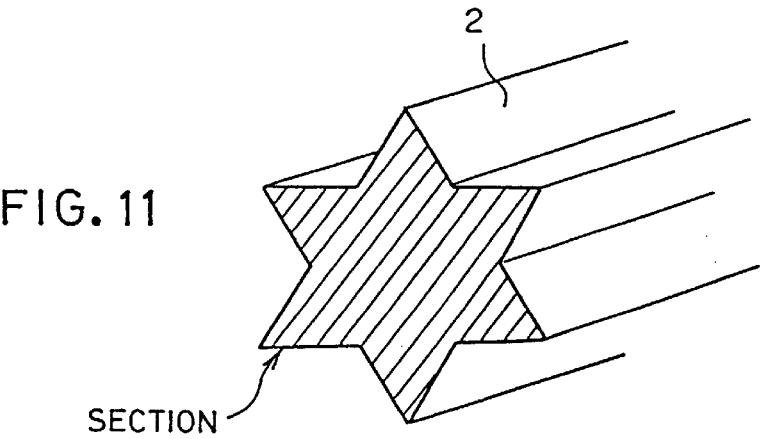
FIG. 11 is a perspective view of a fine wire fin employed in a heat exchanger for an air conditioner in a seventh embodiment according to the present invention.

FIG. 11 is a perspective view showing the section of a fine wire fin included in a heat exchanger for an air conditioner, in a seventh embodiment according to the present invention. As shown in FIG. 11, a fine wire fin 2, for being weaved, having a section shape other than a circular shape. The section of the fine wires for forming the fine wire fins may be any suitable concave polygon, such as a concave pentagon, a concave hexagon, a concave heptagon, a concave octagon, a concave nonagon or a concave decagon, and the corners need not necessarily be sharp edges and may be rounded.

The heat exchanging quantity of this heat exchanger is greater than that of a heat exchanger formed by helically winding round fine wires having the same sectional area as that of the fine wires having a cross section resembling a concave polygon of this embodiment around heat-transfer tubes at the same pitch because the surface area of the fine wire fins 2 of the heat exchanger in this embodiment is greater than that of the fine wire fins formed by helically winding the round fine wires around the heat-transfer tubes. Other mechanisms of this embodiment effective in promoting heat transfer are the same as those of the first embodiment and hence the description thereof will be omitted.

Figure 12:
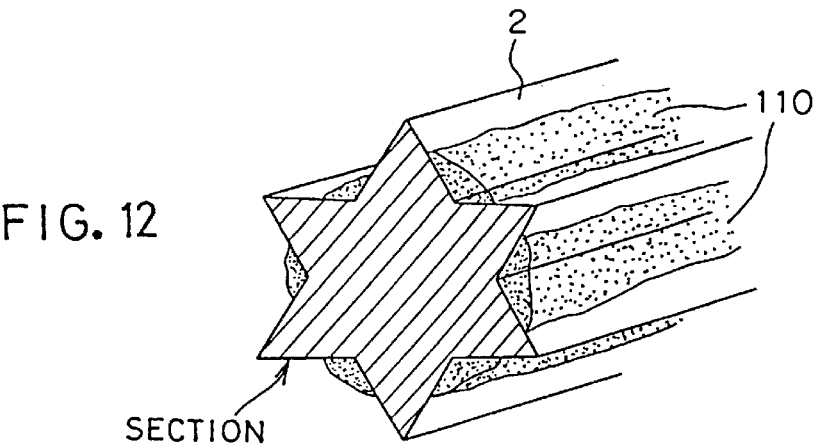
FIG. 12 is a perspective view of a fine wire fin employed in a heat exchanger for an air conditioner in the seventh embodiment according to the present invention.

The fine wire fins 2 suppresses reduction in heat exchanging quantity due to reduction in the flow of the air. When moisture contained in the atmosphere condenses in water droplets 10 on the heat exchanger, the condensed water droplets 10 are able to flow easily along grooves formed in the surfaces of the fine wire fins 2 as shown in FIG. 12. Therefore, the heat exchanger is hardly clogged with condensed water droplets even if the surface of the heat exchanger is wet during operation and hence the heat exchanger does not cause significant pressure loss of the external fluid.

Figure 13:
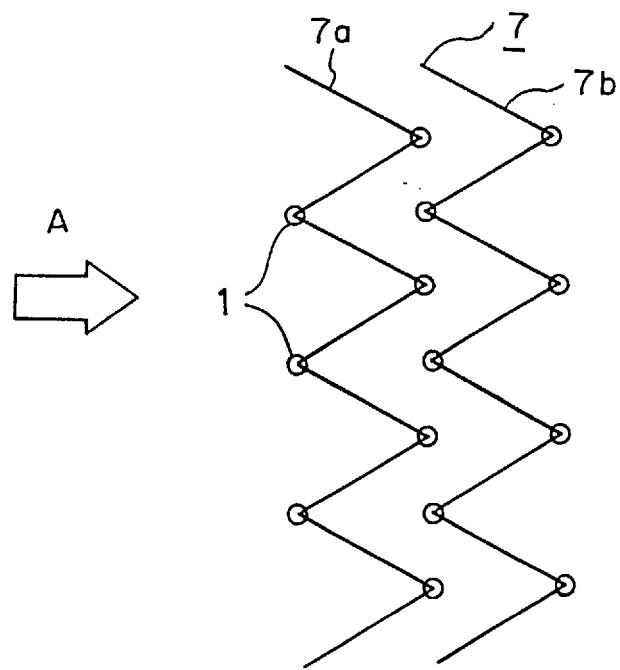
FIG. 13 is a fragmentary sectional view of the main part of a heat exchanger for an air conditioner in an eighth embodiment according to the present invention.

Referring to FIG. 13 showing a heat exchanger for an air conditioner, in an eighth embodiment according to the present invention in a fragmentary sectional view, the heat exchanger has heat-transfer surfaces 7 formed by weaving fine wire fins and including a plurality of heat-transfer tubes 1 arranged at predetermined intervals. An external fluid, such as air, flows in the direction of the arrow A. The heat exchanger has a plurality of lines comprising heat-transfer sections 7a and 7b which are bent in a zigzag form at the heat-transfer tubes 1. The heat-transfer tubes 1 are arranged at ridges and saddles of the heat-transfer sections 7a and 7b which sectional view are zigzags. The ridges of the heat-transfer section 7b on the backward side protrude into the furrows of the heat-transfer section 7a on the front side.

Since the heat transfer surfaces 7 comprising the heat-transfer sections 7a and 7b are inclined to the direction of the arrow A, the ratio of the heat-transfer area to the frontal area is large and hence the heat exchanger exchanges heat at a high heat exchanging quantity. The space required for installing the heat exchanger is small as compared with that required by a heat exchanger having flat heat-transfer surfaces of the same heat-transfer area. Since the flow of an air through a unit area of the heat-transfer surface is comparatively small, the flow velocity of the air relative to the heat-transfer surfaces is comparatively low and hence the pressure loss caused by each heat-transfer surface is small. Mechanisms of this embodiment effective in promoting heat transfer are the same as those of the first embodiment and hence the description thereof will be omitted.

Figure 14:
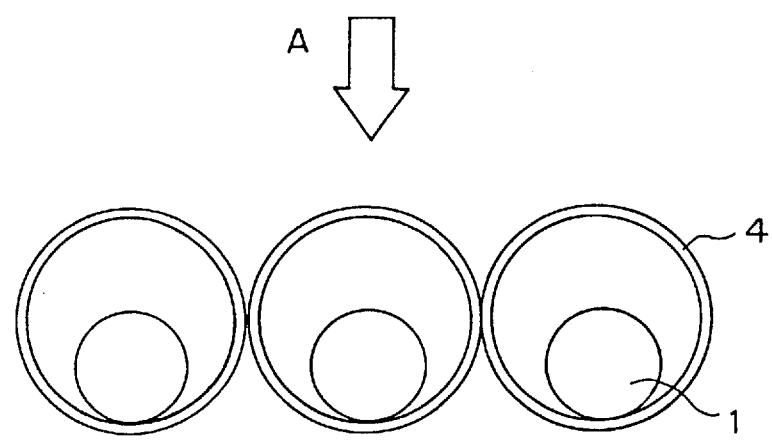
FIG. 14 is a fragmentary sectional view of the main part of a heat exchanger for an air conditioner in a ninth embodiment according to the present invention.

Referring to FIG. 14 showing a heat exchanger for an air conditioner, in a ninth embodiment according to the present invention in a fragmentary sectional view, there exist a heat-transfer tube 1 and ring fins 4 realizing heat transfer fins. An external fluid, such as air, flows in the direction of the arrow A. The inside diameter of the ring fins 4 is greater than the outside diameter of the heat-transfer tubes 1, the centers of the ring fins 4 are dislocated toward the upper side with respect to the direction of the windward or upper part of the flow from the center axes of the corresponding heat-transfer tubes 1 so that parts of the inner surfaces of the ring fins 4 on the lower side are in contact with the outer circumference of the corresponding heat-transfer tubes 1. The plurality of ring fins 4 are arranged axially of each heat-transfer tube 1 at a pitch not smaller than the diameter of the fine wire forming the ring fins 4. The ring fins 4 are fixed to the heat-transfer tubes 1 at the contact points.

In operation, the air flow velocity increases as the air flows through spaces between the portions of the ring fins 4 on the upper side of the heat-transfer tubes 1, and the ring fins 4 disturb the currents of the air flows in Kármán vortex streets toward the heat-transfer tubes 1. The air does not flow straight toward the heat-transfer tubes 1, threads its way through the spaces between the ring fins 4 and the heat-transfer tubes 1, generating small vortices. The vortices disturb the currents of the air at the rear portions of the ring fins on the lower side and the heat-transfer tubes 1. Since the ring fins 4 are dislocated toward the upper side relative to the heat-transfer tubes 1 and the rear portions of the ring fins 4 are in contact with the heat-transfer tubes 1, the flow of the air is deflected by the ring fins 4 and air reaches the rear sides having a low heat-transfer coefficient of the heat-transfer tubes 1. Consequently, heat transfer is promoted and the heat exchanger transfers heat at a high heat-transfer rate. The ring fins 4 increases the heat-transfer area.

Since the inside diameter of the ring fins 4 is greater than the outside diameter of the heat-transfer tubes 1, comparatively large spaces are formed between the heat-transfer tubes 1 and the ring fins 4 and hence condensed water droplets are hardly able to stay on the heat exchanger even if the heat exchanger is used in a moist atmosphere where moisture contained in the atmosphere condenses in water droplets. Therefore, the heat exchanger is hardly clogged with condensed water droplets and reduction in heat exchanging quantity due to reduction in the flow of the air can be suppressed.

The heat exchanger may be provided with elliptic ring fins instead of the ring fins with their major axes in parallel to the flowing direction of the air, and the heat transfer tubes 1 may be arranged at smaller intervals to increase the overall heat-transfer area.

Figure 15:
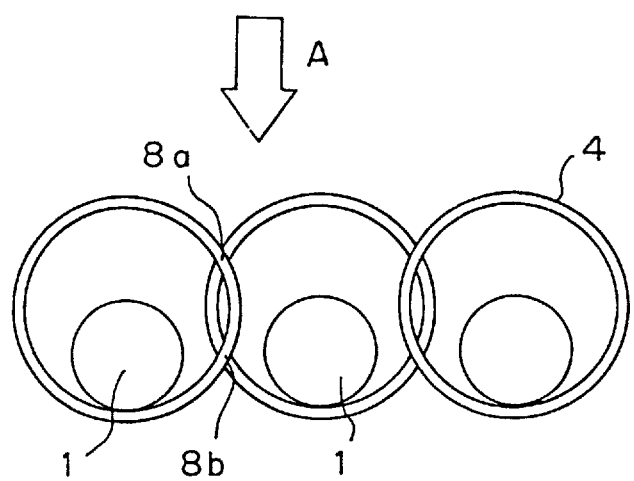
FIG. 15 is a fragmentary sectional view of the main part of a heat exchanger for an air conditioner in a tenth embodiment according to the present invention.

Referring to FIG. 15 showing a heat exchanger for an air conditioner, in a tenth embodiment according to the present invention in a fragmentary sectional view, there exist a heat-transfer tube 1 and ring fins 4 realizing heat transfer fins. An external fluid, such as air, flows in the direction of the arrow A. The inside diameter of the ring fins 4 is greater than the outside diameter of the heat-transfer tubes 1, the centers of the ring fins 4 are dislocated from the center axes of the corresponding heat-transfer tubes 1 toward the upper side of the external operating fluid so that parts of the inner surfaces of the ring fins 4 on the lower side are in contact with the outer circumference of the corresponding heat-transfer tubes 1. The transversely adjacent ring fins 4 cross each other and joined together at crossing points 8a and 8b.

In operation, the air flow velocity increases as the air flows through spaces between the front portions of the ring fins 4, and the ring fins 4 disturbs the currents of the air and the air flows in Kármán vortex streets toward the heat-transfer tubes 1. The air is unable to flow straight toward the heat-transfer tubes 1 and threads its way through spaces between the ring fins 4 and the heat-transfer tubes 1, generating small vortices. The small vortices swirl around the rear portions of the ring fins 4 and the heat-transfer tubes 1 in turbulent currents. Since the rear portions on the lower side of the ring fins 4 are attached to the heat-transfer tubes 1, the ring fins 4 deflects the currents of the air so that the air is able to reach the rear portions having a low heat-transfer coefficient on the lower side of the heat transfer tubes 1. Consequently, heat transfer is promoted and the heat exchanger transfers heat at a high heat-transfer rate. Since the transversely adjacent ring fins 4 cross each other and joined together at crossing points 8a and 8b, the heat-transfer surface has a firm construction, the heat transfer tubes 1 can be arranged at comparatively small intervals, and the heat exchanger has a comparatively large heat-transfer area.

Since the inside diameter of the ring fins 4 is greater than the outside diameter of the heat-transfer tubes 1, comparatively large spaces are formed between the ring fins 4 and the heat-transfer tubes 1. Therefore, condensed water droplets are hardly able to stay on the heat exchanger even if the heat exchanger is used in a moist atmosphere where moisture contained in the atmosphere condenses in water droplets, the heat exchanger is hardly clogged with condensed water droplets and reduction in heat exchanging quantity due to reduction in the flow of the air can be suppressed.

Figure 16:
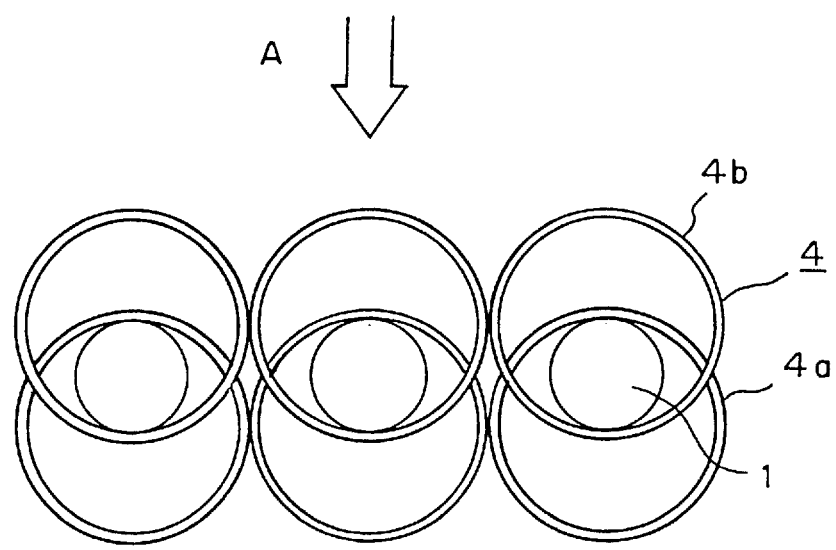
FIG. 16 is a fragmentary sectional view of the main part of a heat exchanger for an air conditioner in a eleventh embodiment according to the present invention.

Referring to FIG. 16 showing a heat exchanger for an air conditioner, in an eleventh embodiment according to the present invention in a fragmentary sectional view, there exist a heat-transfer tube 1 and ring fins 4 realizing heat transfer fins. An external fluid, such as air, flows in the direction of the arrow A. The inside diameter of the ring fins 4 is greater than the outside diameter of the heat-transfer tubes 1, and portions of the ring fins are attached to the outer surface of the corresponding heat-transfer tubes 1 so as to function as heat transfer fins. A ring fin 4a is dislocated from the heat-transfer tube 1 toward the rear side with respect to the direction of the arrow A and another ring fin 4b is dislocated from the heat-transfer tube 1 toward the front side with respect to the direction of the arrow A. A pair of ring fins 4a and 4b are arranged alternately axially of the heat-transfer tube 1. The transversely adjacent rear ring fins 4a, and the transversely adjacent front ring fins 4b may cross each other and joined together at least one crossing point similarly to the ring fins 4 of the ninth and the tenth embodiment.

In operation, the air flow velocity increases as the air flows through the spaces between the ring fins 4b which extend to the front direction of the heat-transfer tube 1, the ring fins 4a disturbs the currents of the air, and the air flows in Kármán vortex streets toward the heat-transfer tubes 1. The air is unable to flow straight toward the heat-transfer tubes 1 and threads its way through the spaces between the ring fins 4 and the heat-transfer tubes 1 in small vortices and the turbulent currents of the air having the small vortices reach the ring fins 4a and the heat-transfer tubes 1. Since the ring fins 4b is in contact with the rear side of the heat-transfer tubes, the ring fins 4b deflects the flow of the air toward the rear side having a low heat-transfer coefficient of the heat-transfer tube 1. The rear ring fins 4a increases the heat-transfer area. Consequently, heat transfer is promoted, the heat exchanger transfers heat at a high heat-transfer rate. Since the front ring fin 4b and the rear ring fin 4a are arranged alternately axially of the corresponding heat-transfer tubes 1 and contiguously with each other, the pitch of the rear ring fins 4a and that of the front ring fins 4b are determined automatically.

Since the inside diameter of the ring fins 4 is greater than the outside diameter of the heat-transfer tubes 1, comparatively large spaces are formed between the ring fins 4 and the heat-transfer tubes 1. Therefore, condensed water droplets is hardly able to stay on the heat exchanger when the heat exchanger is used in a moist atmosphere where moisture contained in the atmosphere condenses in water droplets, the heat exchanger is hardly clogged with condensed water droplets and reduction in heat exchanging quantity due to reduction in the flow of the air can be suppressed.

Figure 17:
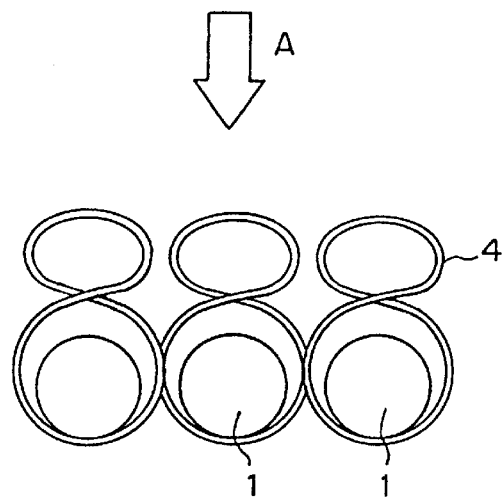
FIG. 17 is a fragmentary sectional view of the main part of a heat exchanger for an air conditioner in a twelfth embodiment according to the present invention.

FIG. 17 is a fragmentary sectional view of a heat exchanger for an air conditioner, in a twelfth embodiment according to the present invention. This heat exchanger is provided with a heat-transfer tube 1 and 8-shaped ring fins 4 instead of the ring fins 4 of the ninth embodiment. Portions of the 8-shaped ring fins 4 are attached to the outer surface of heat-transfer tubes 1 arranged at predetermined intervals. An external fluid, such as air, flows in the direction of the arrow A.

In operation, the front portions of the 8-shaped ring fins 4 disturb the currents of the air in vortices and the twisted portions of the 8-shape ring fins 4 further disturb the turbulent currents of the air so that vortices of the air spread over the entire surface of the heat exchanger to promote the heat transfer function of the heat-transfer tubes 1 and, consequently, the heat exchanging quantity of the heat exchanger is enhanced. Mechanisms of this embodiment effective in promoting heat transfer are the same as those of the ninth embodiment and hence the description thereof will be omitted.

Figure 18:
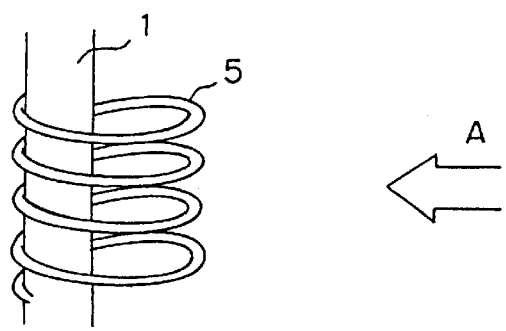
FIG. 18 is a fragmentary perspective view of the main part of a heat exchanger for an air conditioner in a thirteenth embodiment according to the present invention.

Referring to FIG. 18 showing a heat exchanger for an air conditioner, in a thirteenth embodiment according to the present invention, there exist a heat-transfer tube 1 and a coil ring fin 5 formed like a coil and realizing a heat transfer fin. An external fluid, such as air, flows in the direction of the arrow A. The inside diameter of the coil ring fin 5 is greater than the outside diameter of the heat-transfer tubes 1, the pitch of the coil ring fin 5 on each heat-transfer tube 1 is twice the diameter of the fine wire or above, and portions of the inner surfaces of the coil ring fin 5 are attached to the outer surfaces of the corresponding heat-transfer tubes 1. As the coil ring fin 5 is formed by helically connecting of ring fins, it can comparatively easily be formed and be firm and strong. Mechanisms of this embodiment effective in promoting heat transfer are the same as those of the ninth embodiment and hence the description thereof will be omitted.

Figure 19:
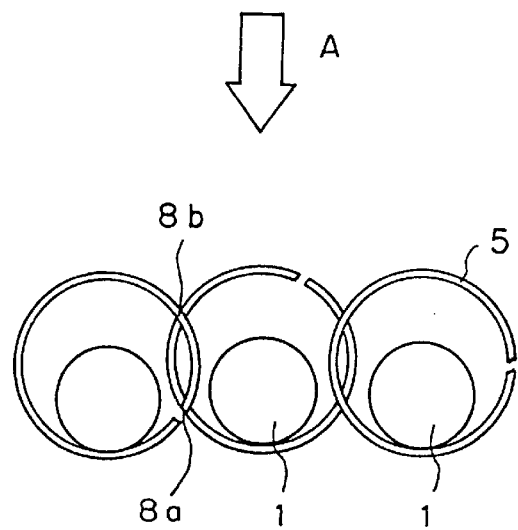
FIG. 19 is a fragmentary sectional view of the main part of a heat exchanger for an air conditioner in a fourteenth embodiment according to the present invention.

Referring to FIG. 19 showing a heat exchanger for an air conditioner, in a fourteenth embodiment according to the present invention in a fragmentary sectional view, there exist heat-transfer tubes 1 and a coil ring fins 5 formed like a coil and realizing a heat transfer fin. An external fluid, such as air, flows in the direction of the arrow A. The inside diameter of the coil ring fin 5 is greater than the outside diameter of the heat-transfer tubes 1, the pitch of the coil ring fin 5 on each heat-transfer tube 1 is twice the diameter of the fine wire or above, and portions of the inner surfaces of the coil ring fin 5 are attached to the outer surfaces of the corresponding heat-transfer tubes 1. Since the transversely adjacent coil ring fins 5 cross each other and joined together at crossing points 8a and 8b, the coil ring fins 5 are firm and strong, the heat-transfer tubes 1 can be arranged at comparatively small intervals to increase heat-transfer area. The coil ring fins 5 can comparatively easily formed. Mechanisms of this embodiment effective in promoting heat transfer are the same as those of the ninth embodiment and hence the description thereof will be omitted.

Figure 20:
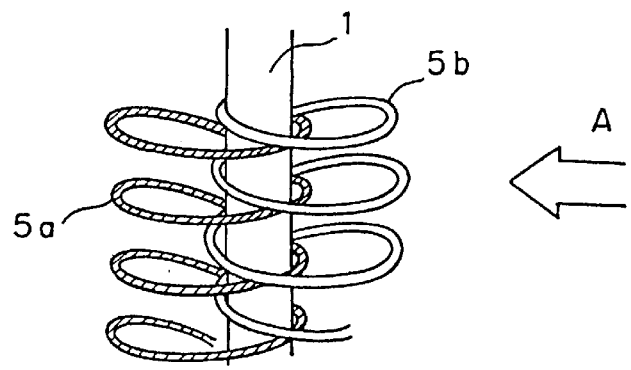
FIG. 20 is a fragmentary perspective view of the main part of a heat exchanger for an air conditioner in a fifteenth embodiment according to the present invention.

Referring to FIG. 20 showing a heat exchanger for an air conditioner, in a fifteenth embodiment according to the present invention, there exist a heat-transfer tube 1 and coil ring fins 5a, 5b (which are designated inclusively by "5") realizing heat-transfer fins, respectively. An external fluid, such as air, flows in the direction of the arrow A. The inside diameter of the coil ring fins 5 is greater than the outside diameter of the heat-transfer tubes 1, and the pitch of the coil ring fins 5 is twice the diameter of the fine wires or above. Portions of the inner surfaces of the coil ring fins 5 are attached to the outer surfaces of the corresponding heat-transfer tubes 1. The coil ring fins 5a are attached to the front side of the heat-transfer tube 1 in view of the direction of the flow A, and the coil ring fins 5b are attached to the rear side of the heat-transfer tube 1 in view of the direction of the flow A. Mechanisms of this embodiment effective in promoting heat transfer are the same as those of the ninth embodiment and hence the description thereof will be omitted.

Figure 21:
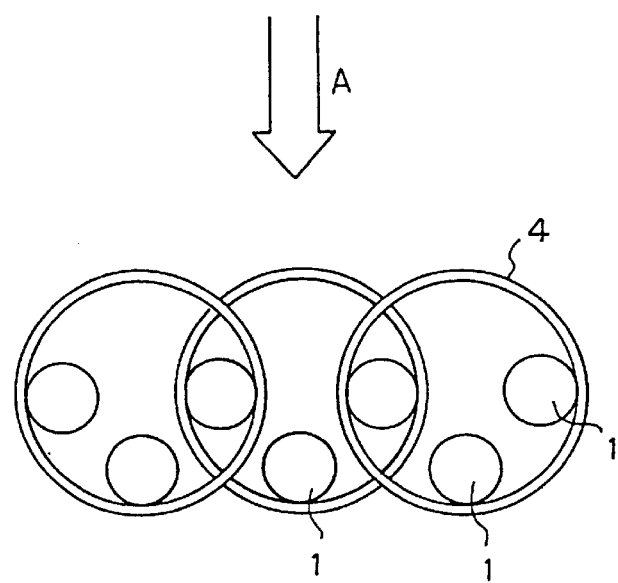
FIG. 21 is a fragmentary sectional view of the main part of a heat exchanger for an air conditioner in a sixteenth embodiment according to the present invention.

Referring to FIG. 21 showing a heat exchanger for an air conditioner, in a sixteenth embodiment according to the present invention, there exist heat-transfer tubes 1 and coil ring fins 4, which is similar to those of the seventh to the thirteenth embodiment. The inside diameter of the ring fins 4 is greater than the outside diameter of the heat-transfer tubes 1. Portions of inner surfaces of each ring fin 4 is attached to the outer surfaces of the three heat-transfer tubes 1. An external fluid, such as air, flows in the direction of the arrow A. Since each ring fin 4 is in contact with the plurality of heat-transfer tubes 1, the heat-transfer rate of the heat exchanger enhanced by the current disturbing action of the heat-transfer tubes 1 is higher than those of the seventh to the thirteenth embodiment, in which each ring fin is in contact with a single heat-transfer tube. The ring fins 4 can easily be fixed to the heat-transfer tubes and the heat exchanger has a firm construction. Mechanisms of this embodiment effective in promoting heat transfer are the same as those of the ninth embodiment and hence the description thereof will be omitted.

Figure 22:
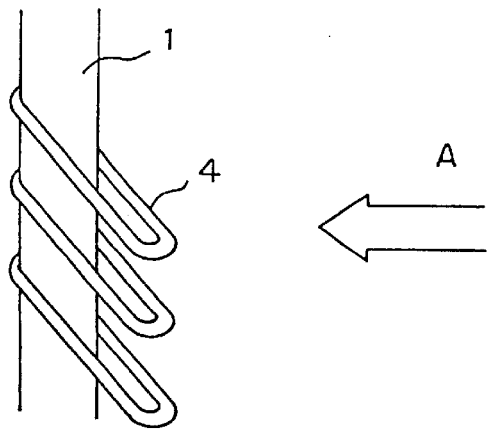
FIG. 22 is a fragmentary perspective view of a heat exchanger for an air conditioner in a seventeenth embodiment according to the present invention.

Referring to FIG. 22 showing a heat exchanger for an air conditioner, in a seventeenth embodiment according to the present invention in a fragmentary perspective view, heat-transfer tubes 1 are arranged at predetermined intervals, and ring fins 4, i.e., heat-transfer fins, having an inside diameter greater than the outside diameter of the heat-transfer tube 1 are attached to the heat-transfer tube 1 so as to extend obliquely downward. An external fluid, such as air, flows in the direction of the arrow A.

When the heat exchanger is used in a moist atmosphere and moisture contained in the atmosphere condenses in water drops on the heat exchanger, condensed water droplet drain off by gravity along the ring fins 4, so that the heat exchanger will not be clogged with condensed water drops.

Mechanisms of this embodiment effective in promoting heat transfer are the same as those of the ninth embodiment and hence the description thereof will be omitted.

Figure 23:
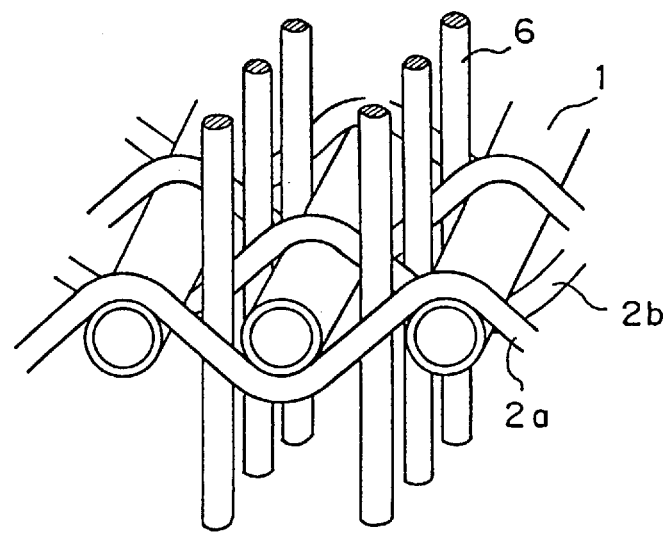
FIG. 23 is a fragmentary perspective view of the main part of a heat exchanger for an air conditioner in an eighteenth embodiment according to the present invention.

Referring to FIG. 23 showing a heat exchanger for an air conditioner, in an eighteenth embodiment according to the present invention in a fragmentary perspective view, heat-transfer tubes 1 are arranged at predetermined intervals to pass an internal fluid, such as a cooling medium, and fine wires are passed alternately over and under the heat-transfer tubes 1 to form fine wire fins 2a and 2b, i.e., heat-transfer fins. Intervals between the fine wire fins 2a and 2b as the weft are twice the diameter of the fine wire or above. Needle fins 6 are inserted perpendicularly to a heat-transfer surface formed by interlacing the fine wires and the heat-transfer tubes 1 in spaces defined by the fine wire fins and the heat-transfer tubes 1, and the needle fins 6 are attached to the fine wire fins 2a and 2b, or the heat-transfer tubes 1.

In operation, an external fluid, such as air, threads its way through spaces between the fine wire fins 2a and 2b, needle fins 6 and the heat-transfer tubes 1, generating minute vortices. The minute vortices swirl in turbulent currents around portions on the lower side with respect to the flowing direction of the air of the fine wire fins 2a and 2b, the needle fins 6 and the heat-transfer tubes 1. Consequently, heat transfer is promoted and the heat exchanger transfers heat at a high heat-transfer rate. Since the needle fins 6 increases the heat-transfer area along the flowing direction of the air, the heat exchanging quantity can be increased. Since the intervals between the fine wire fins 2a and 2b are increased and spaces between the fine wire fins 2a and 2b are expanded by the needle fins 6, condensed water droplets are hardly able to stay on the heat exchanger when the heat exchanger is used in a moist atmosphere where moisture contained in the atmosphere condenses in water droplets on the heat exchanger, the heat exchanger is hardly clogged with condensed water droplets, and reduction in heat exchanging quantity due to reduction in the flow of the air can be suppressed.

Figure 24:
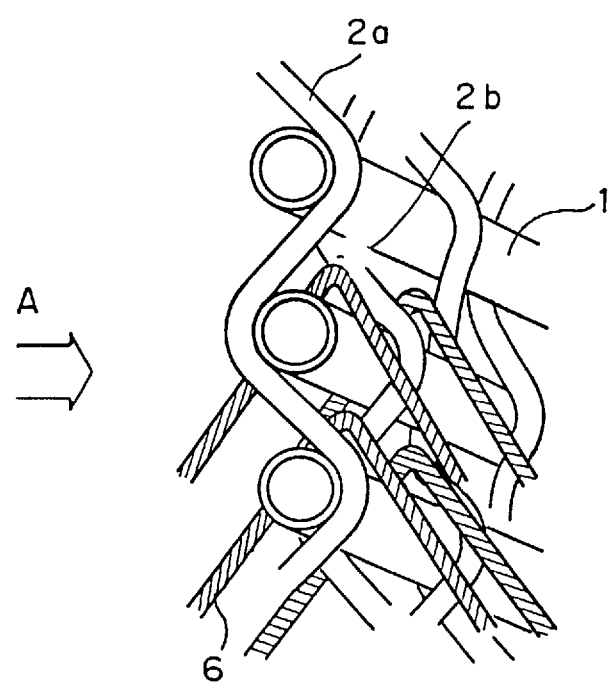
FIG. 24 is a fragmentary perspective view of the main part of a heat exchanger for an air conditioner in a nineteenth embodiment according to the present invention.

Referring to FIG. 24 showing a heat exchanger for an air conditioner, in a nineteenth embodiment according to the present invention in a fragmentary perspective view, heat-transfer tubes 1 are arranged at predetermined intervals to pass an internal fluid, such as a cooling medium, and fine wires are passed alternately over and under the heat-transfer tubes 1 to form fine wire fins 2a and 2b, i.e., heat-transfer fins. Intervals between the fine wire fins 2a, 2b as the weft are twice the diameter of the fine wire or above. Needle fins 6 are inserted in spaces formed between the heat-transfer tubes 1 and the fine wire fins so as to extend obliquely downward, and the needle fins 6 are attached to the fine wire fins 2a and 2b, or the heat-transfer tubes 1. Although the needle fins 6 are bent in a plane perpendicular to the axes of the heat-transfer tubes 1 in this embodiment, the needle fins 6 may be bent in a plane parallel to the axes of the heat-transfer tubes 1 provided that the top of the needle fins 6 looks obliquely downward. Mechanisms of this embodiment effective in promoting heat transfer are the same as those of the ninth embodiment and hence the description thereof will be omitted.

Although the effect of this embodiment is similar to that of the eighteenth embodiment, spaces between the fine wire fins 2a and 2b in this embodiment are larger than those in the eighteenth embodiment. Since the needle fins 6 are bent as being obliquely downward, water droplets condensed on the heat exchanger drain off along the needle fins 6 by gravity. Therefore, the heat exchanger is hardly clogged with condensed water droplets when the same is used in a moist atmosphere where moisture contained in the atmosphere condenses in water droplets on the heat exchanger and reduction in heat exchanging quantity due to reduction in the flow of the air can be suppressed.

Figure 25:
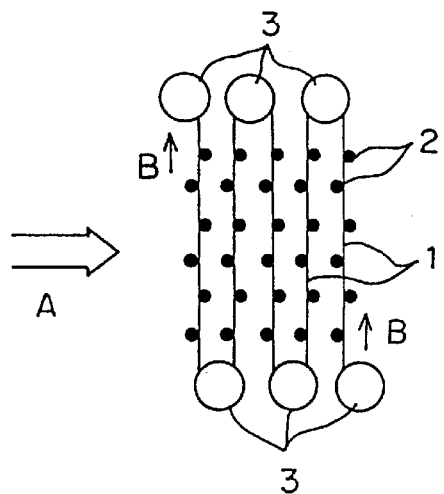
FIG. 25 is a fragmentary sectional view of a heat exchanger for an air conditioner in a twentieth embodiment according to the present invention.

Referring to FIG. 25 showing a heat exchanger for an air conditioner, in a twentieth embodiment according to the present invention in a fragmentary sectional view, there exist heat-transfer tubes 1, fine wires are passed alternately over and under the heat-transfer tubes 1 of each row to form fine wire fins 2, and headers 3. An external fluid, such as air, flows in the direction of the arrow A. The heat exchanger in this embodiment has a plurality of heat-transfer surfaces. A nonazeotropic cooling medium is used as an internal operating fluid in the heat-transfer tubes 1. The nonazeotropic cooling medium flows from the rear header 3 into the heat-transfer tubes 1 of the rear row in the direction of the arrow B, flows sequentially through the headers 3 and the heat-transfer tubes 1 of the intermediate rows toward the heat-transfer tubes 1 of the front row, and flows into the front header 3. Thus, the nonazeotropic cooling medium flows across the flow of air flowing in the direction of the arrow A in a virtually counterflow mode.

Figure 26:
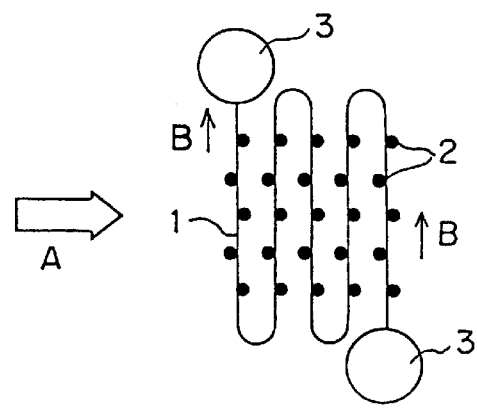
FIG. 26 is a fragmentary sectional view of a heat exchanger in a modification of the heat exchanger in FIG. 25.
Figure 27:
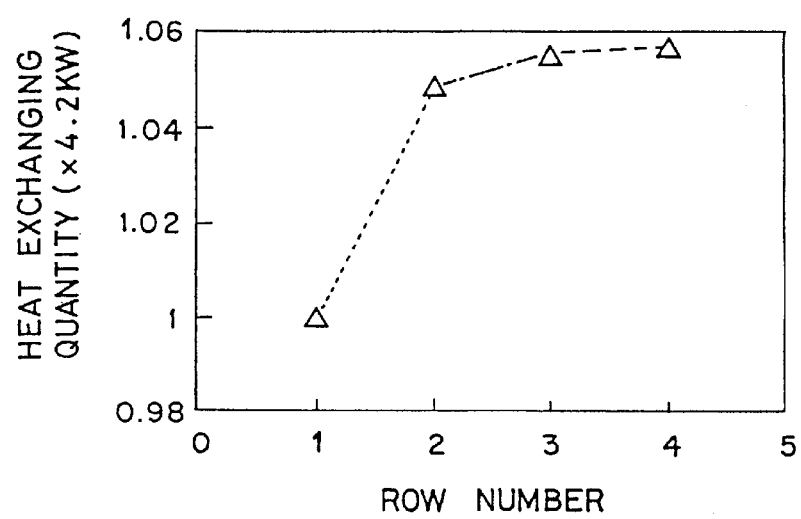
FIG. 27 is a graph showing the dependence of heat exchanging quantity on the number banks of the heat-transfer surfaces in the heat exchanger in the twentieth embodiment when a nonazeotropic cooling medium is used.

Suppose that the nonazeotropic cooling medium is used as an internal operating fluid that flows through the heat-transfer tubes 1, the temperature of the nonazeotropic cooling medium, which phase change occurs in the heat exchanger, changes. In case the temperature of the nonazeotropic cooling medium at the inlet of the heat exchanger is fixed, the heat exchanging quantity of a heat exchanger provided with heat-transfer tubes arranged in a plurality of rows, in which the nonazeotropic cooling medium flows across the air flow in a virtually counterflow mode, is higher than that of a heat exchanger provided with heat-transfer tubes arranged in a single row, in which the nonazeotropic cooling medium flows simply across the air flow, which will be obvious from FIG. 27. Therefore, by the construction of the heat exchanger as shown in FIG. 25, the heat exchanging quantity of the heat exchanger becomes higher. It is also possible to bent heat transfer surfaces without intermediate headers 3 as shown in FIG. 26.

Figure 1:
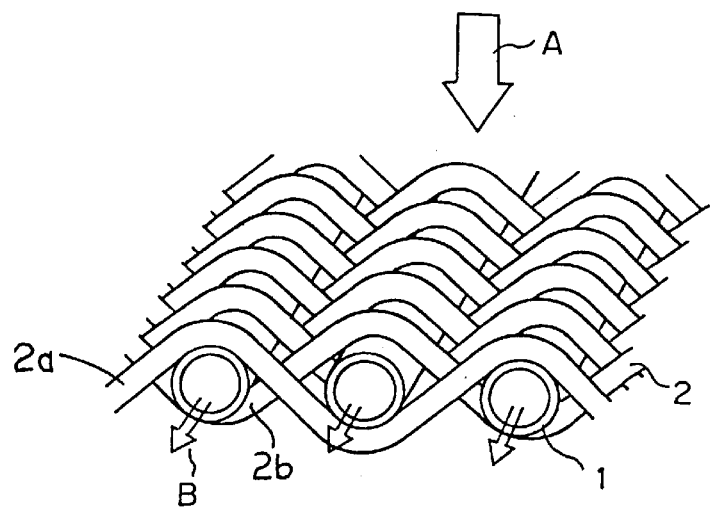
FIG. 1 is a fragmentary perspective view of the heat transfer plane of a conventional heat exchanger for an air conditioner.
Figure 2:
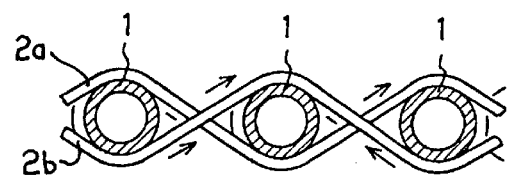
FIG. 2 is an enlarged fragmentary sectional view of a conventional heat exchanger, showing the flow of air on the heat exchanger.
Figure 3:
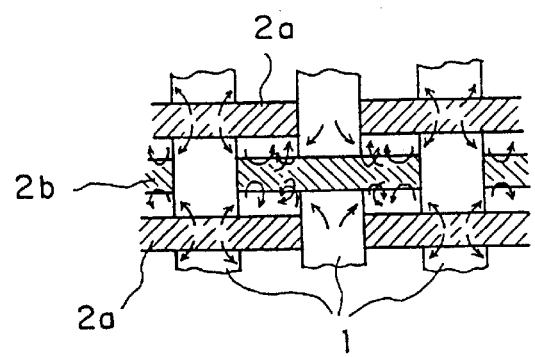
FIG. 3 is a fragmentary plan view of the heat transfer plane of a conventional heat exchanger.
Figure 28:
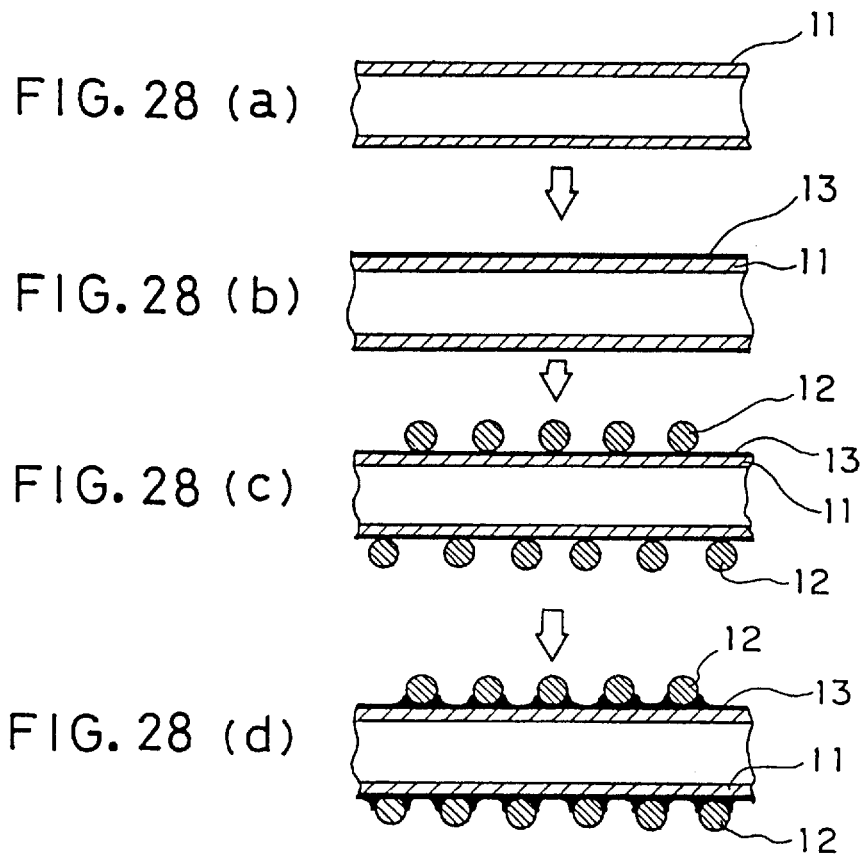
FIGS. 28(a) to 28(d) are sectional views of assistance in explaining a method of fabricating a heat exchanger for an air conditioner in a twenty-first embodiment according to the present invention.

FIGS. 28(a) to 28(d) are drawings for indicating a principal part of a heat exchanger for an air conditioner and for explaining a method of producing the heat exchanger, in a twenty-first embodiment according to the present invention at different stages of fabrication. Very thin heat-transfer tubes 11 of copper as shown in FIG. 28(a) are plated by electroless plating using a plating path of 87 to 93% Ni, 1 to 12% P and 1% the rest heated at 90° C. to coat the external surfaces of the heat-transfer tubes 11 with a Ni film 13 of a-thickness in the range of 1 to 10 $\mu$m as shown in FIG. 28(b). Then, the plated heat-transfer tubes 11 are arranged in a row and fine wires of, for example, copper, are passed alternately over and under the plated heat-transfer tubes 11 to form fine wire fins 12 by the conventional method as explained previously to form a woven structure as shown in to FIG. 1. Then, the woven structure is heated at 950° C. for thirty minutes in a brazing furnace evacuated to a vacuum in the range of about $10^{-3}$ Torr. Consequently, the Ni film 13 melts and the molten Ni is caused to gather by surface tension and wettability at contacts between the heat-transfer tubes 11 and the fine wire fins 12 in fillets as shown in FIG. 28(d). Thus, the heat-transfer tubes 11 and the fine wire fins 12 are bonded firmly together after the molten Ni has solidified to complete a heat exchanger.

Although the operation of the heat exchanger in this embodiment is the same as that of the conventional heat exchanger, the heat-transfer tubes 11 and the fine wire fins 12 are kept in perfect thermal contact with each other by the fillets of the plating material. Since the thickness of the Ni film 13 can be determined by selectively determining the plating time, the heat-transfer tubes 11 and the fine wire fins 12 can precisely be joined together and spaces between the heat-transfer tubes 11 and the fine wire fins 12 are never clogged with the excessive plating material. Therefore, heat can efficiently be transferred between the heat-transfer tubes 11 and the fine wire fins 12 to improve the heat exchanging efficiency of the heat exchanger.

Figure 29A:
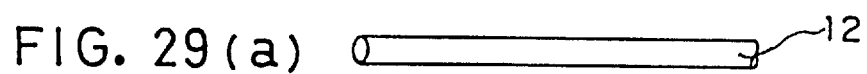
FIGS. 29(a) to 29(d) are sectional views of assistance in explaining a method of fabricating a heat exchanger for an air conditioner in a twenty-second embodiment according to the present invention.
Figure 29B:
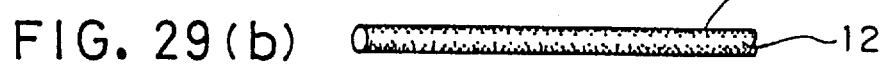
Figure 29C:
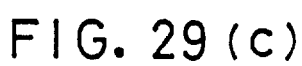
Figure 29D:
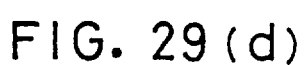

FIGS. 29(a) to 29(d) show steps of another method of producing the same heat exchanger embodying the present invention. Although in the twenty-first embodiment the heat-transfer tube 11 is plated with Ni, in this embodiment, the fine wire fins 12 are Ni-plated by electroless Ni plating in a step shown in FIG. 29(a) to coat the surfaces of the fine wire fins with a Ni film of a thickness in the range of 1 to 10 μm as shown in FIG. 29(b). The Ni-plate fine wire fins are passed alternately over and under heat-transfer tubes 11 to form a woven structure as shown in FIG. 29(c), and then the woven structure is heated in the same manner to bond the heat-transfer tubes 11 and the Ni-plated fine wire fins 12 together with fillets of Ni as shown in FIG. 29(d). When the heat-transfer tubes 11 are plated, it is possible that the inner surfaces of the heat-transfer tubes 11 are Ni-plated. When the fine wires for forming the fine wire fins 12 are Ni-plated, the inner surfaces of the heat-transfer tubes 11 are never Ni-plated.

Figure 30:
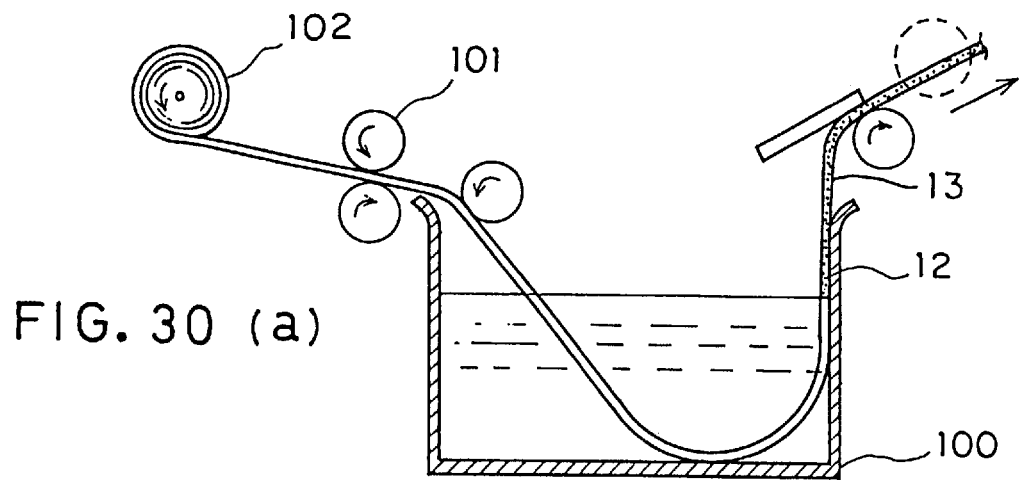
FIGS. 30(a) to 30(d) are schematic sectional views of assistance in explaining a method of fabricating a heat exchanger for an air conditioner in a twenty-third embodiment according to the present invention.
Figure 30:
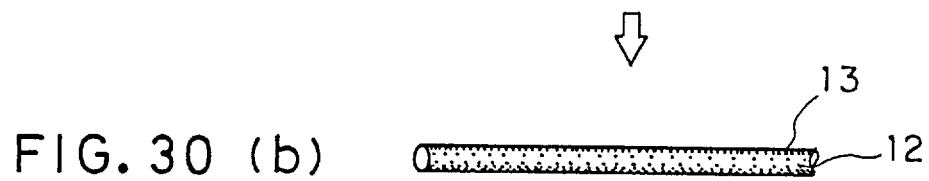
Figure 30:
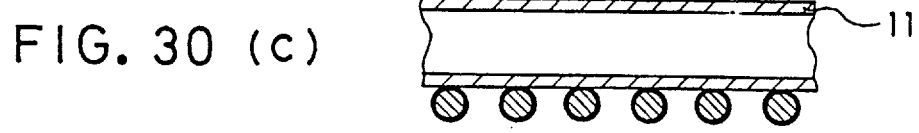
Figure 30:
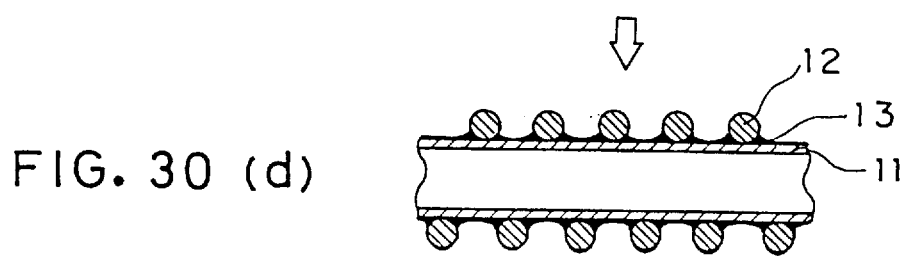

Although in the twenty-second embodiment Ni is used for making the metal film 13, a solder is available. A method of producing a heat exchanger in accordance with the present invention shown in FIGS. 30(a) to 30(d) plates fine wires with a solder. This method cannot be applied to plating fine wire fins with Ni because Ni has a higher temperature point for bonding (heating process temperature). However, it can be applied to plating fine wire fins with a solder because a solder has a lower temperature point for bonding. As shown in FIG. 30(a), either a copper heat-transfer tube 11 or a copper fine wire fin 12 is dipped in a molten solder containing 40% Pb and 60% Sn contained in a tank 100. In the drawings, a fine wire fin 12 unwound from a wire coil 102 by feed rollers 101 is passed continuously through the molten solder contained in the tank 100.

Thus, a fine wire fin 12 coated with a solder film 13 of about 10 μm in thickness as shown in FIG. 30(b) is obtained. Then, as shown in FIG. 30(c), the solder-coated fine wire fins 12 are passed alternately over and under the heat-transfer tubes 11 by the conventional method to form a woven structure. A flux is applied to portions of the woven structure where the fine wire fins 12 are in contact with the heat-transfer tubes 11, and then the woven structure is heated at 185° C. for about ten minutes in an furnace (or on a hot plate) under the atmospheric pressure. Then, the solder film 13 melts and the molten solder is caused to gather in fillets around the portions where the fine wire fins 12 are in contact with the heat-transfer tubes 11 by surface tension and wettability. After the fillets of the solder have solidified, the fine wire fins 12 are bonded firmly to the heat-transfer tubes 11 to complete a heat exchanger as shown in FIG. 30(d). Since the bonded portions of the heat exchanger are heated to a temperature of 100° C. at the highest while the heat exchanger including the heat exchanger is in operation, the solder bonding the fine wire fins 12 and the heat-transfer tubes 11 together withstands the working temperature. Since the bonding temperature of the solder is lower that of Ni, the fine wire fins plated with the solder, as compared with the Ni-plated fine wire fins, can be bonded to the heat-transfer tubes 11 at a lower temperature in a shorter time to the heat-transfer tubes 11.

Figure 31:
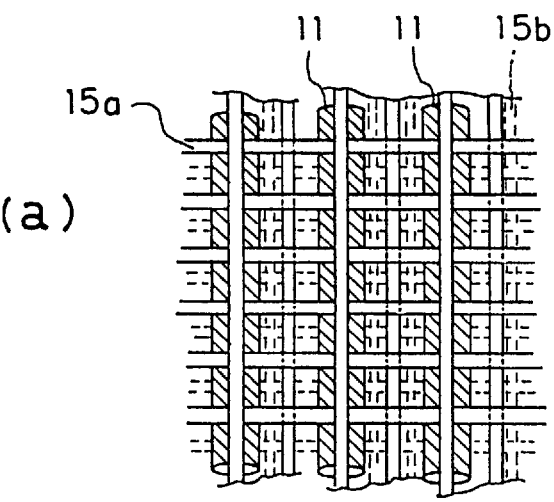
FIGS. 31(a) to 31(c) are a plan view and sectional views, respectively, of assistance in explaining a method of fabricating a heat exchanger for an air conditioner in a twenty-fourth embodiment according to the present invention.
Figure 31:
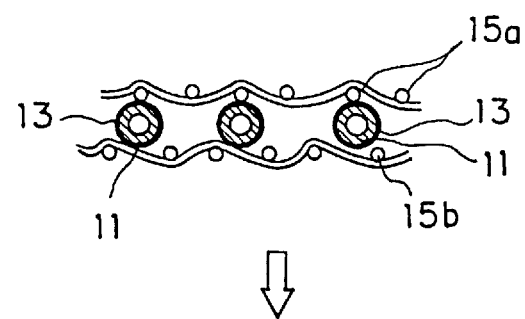
Figure 31:
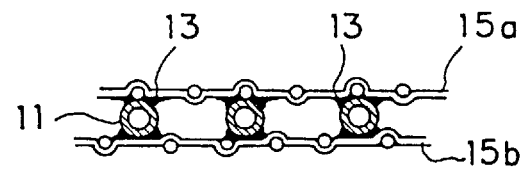

When producing the heat exchangers in the twenty-first to the twenty-third embodiment, an automatic machine for passing the fine wires alternately over and under the heat-transfer tubes 11 is necessary to form the woven structure consisting of the fine wire fins 12 and the heat-transfer tubes 11, and such a process requires a considerably long time. A heat exchanger in a twenty-fourth embodiment according to the present invention is produced by a method illustrated by FIGS. 31(a) to 31(c). First, heat-transfer tubes 11 plated are arranged at predetermined intervals in a row, and the row of the heat-transfer tubes 11 is sandwiched between a upper wire gauze 15a and a lower wire gauze 15b so that the meshes of the upper wire gauze 15a and those of the lower wire gauze 15b are staggered relative to each other as shown in FIG. 31(a). The wire gauzes 15a and 15b are formed by weaving fine wires for forming fine wire fins. Then, the assembly of the heat-transfer tubes 11 and the wire gauzes 15a and 15b is heated in an evacuated brazing furnace at 950° C. for thirty minutes, in which the Ni film 13 melts and molten Ni is caused to gather in fillets around portions where the heat-transfer tubes 11 and the wire gauzes 15a and 15b are in contact with each other by surface tension and wettability. After the fillets of Ni have solidified, the wire gauzes 15a and 15b are bonded firmly to the heat-transfer tubes 11 as shown in FIG. 31(c) to complete a heat exchanger.

In operation, air blown by a blower, not shown, strikes on the upper side of the heat-transfer tubes 11 and the upper wire gauze 15a and flows through the meshes of the upper wire gauze 15a, and then the lower wire gauze 15b disturbs the air currents to generate vortices. The vortices destroy temperature (velocity) boundary layers surrounding the heat-transfer tubes 11 for efficient heat transfer. A heat exchanger fluid, such as a cooling medium, flowing through the heat-transfer tubes 11 exchange heat with the turbulent air currents. Since the heat exchanger can be formed simply by bonding the wire gauzes to the heat-transfer tubes 11 and does not need to weave fine wires, the heat exchanger can be produced in a comparatively short time.

Figure 32:
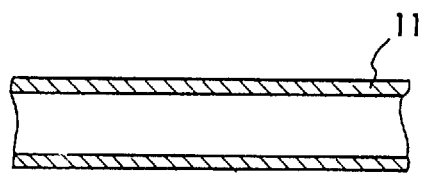
FIGS. 32(a) to 32(d) are schematic sectional views of assistance in explaining a method of fabricating a heat exchanger for an air conditioner in a twenty-fifth embodiment according to the present invention.
Figure 32:
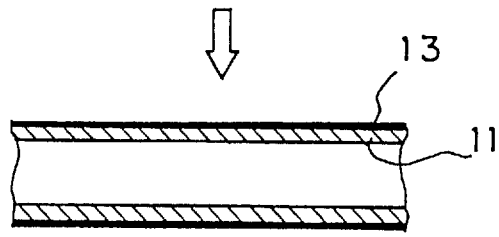
Figure 32:
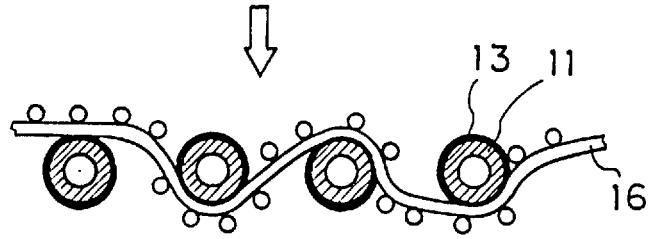
Figure 32:
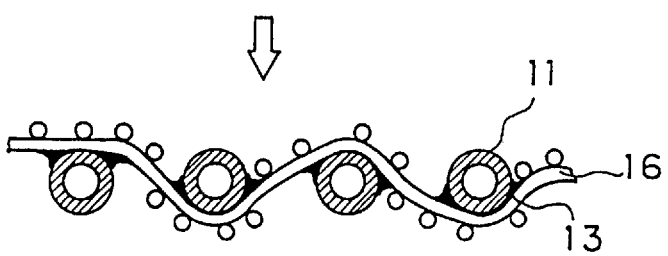

Although in the twenty-fourth embodiment wire gauzes are located at upper and lower sides of the heat-transfer tubes 11, in a twenty-fifth embodiment, a single wire gauze 16 is passed alternately over and under heat-transfer tubes 11 and the wire gauze 16 is bonded to the heat-transfer tubes 11 as shown in FIGS. 32(a) to 32(d). As shown in FIGS. 32(a) and 32(b), the heat-transfer tubes 11 are plated with a Ni film 13 of a thickness in the range of 1 to 10 μm by electroless Ni plating. Then, as shown in FIG. 32(c), the Ni-plated heat-transfer tubes 11 are arranged at predetermined intervals and fixed by a fixing tool (not shown) to produce a line comprising pipes. Then, the copper wire gauze 16 is passed alternately over and under the heat-transfer tubes 11 so as to be in contact with the heat-transfer tubes 11. The assembly of the heat-transfer tubes 11 and the copper wire gauze 16 is heated at 950° C. for thirty minutes in an evacuated brazing furnace and then cooled to complete a heat exchanger as shown in FIG. 32(d).

Although this heat exchanger is less effective in generating vortices, the wire gauze 16 is surely in thermal contact with the heat-transfer tubes 11 because the wire gauze 16 is wound round the heat-transfer tubes 11 and serves as efficient fins, so that the heat exchanger operates at a high heat-transfer efficiency. Although the single heat exchanger is unable to generate effective vortices, effective vortices can be generated in a heat exchanger comprising a plurality of close layers of the heat exchangers, and the heat exchanging ability of such a heat exchanger compares favorably with that of the conventional heat exchanger.

Although the heat-transfer tubes 11 are Ni-plated in the twenty-fourth and the twenty-fifth embodiments, the wire gauzes 15a, 15b and 16 or both the heat-transfer tubes 11 and the wire gauzes 15a, 15b and 16 may be Ni-plated for the same effect. The heat-transfer tubes 11 and/or the wire gauze 16 may be coated with a solder instead of Ni by the processes illustrated by FIGS. 30(a) to 30(d) for the same effect. Heat-transfer tubes and wire gauzes of a material, such as a stainless, other than copper may be used if the heat transfer tubes and the wire gauzes can be plated by inexpensive plating, such as solder plating or Ni plating.

Figure 33:
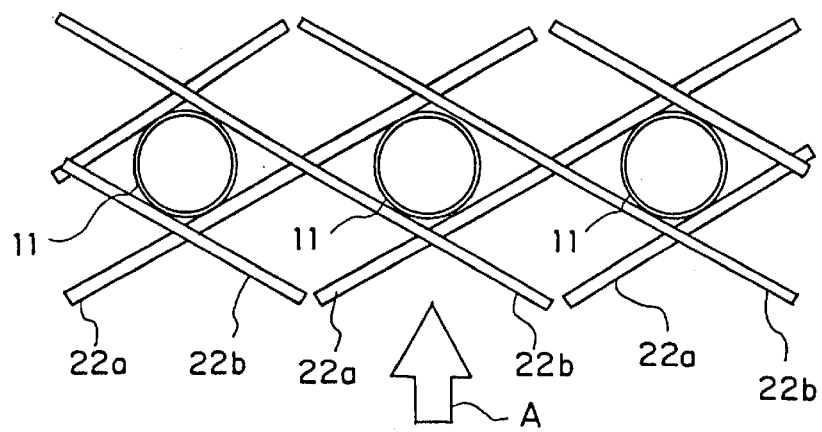
FIG. 33 is a fragmentary sectional view of the main part of a heat exchanger for an air conditioner in a twenty-sixth embodiment according to the present invention.

Referring to FIG. 33 showing a heat exchanger for an air conditioner, in a twenty-sixth embodiment according to the present invention in a fragmentary sectional view, there exist heat-transfer tubes 11 and bar fins 22a and 22b. An external fluid, such as air, flows in the direction of the arrow A. The heat-transfer tubes 11 are arranged at predetermined intervals and the bar fins 22a, 22b are attached to the heat-transfer tubes 11. Each bar fin 22a is extended so as to be in contact with the front part of the left one of two adjacent heat-transfer tubes 11 and with the rear part of the right one of the two adjacent heat-transfer tubes 11, and then each bar fin 22b is extended so as to be in contact with the rear part of the left heat-transfer tube 11 and with the front part of the right heat-transfer tube 11. Thus the bar fins 22a and 22b are extended between the heat-transfer tubes 11 to construct a heat exchanger.

In operation, air flows in the direction of the arrow A toward the heat exchanger. Part of the air passing the bar fins 22a is disturbed by the bar fins 22a and turbulent air currents strike on the bar fins 22b and the heat-transfer tubes 11 to destroy boundary layers surrounding the bar fins 22b and the heat-transfer tubes 11 for efficient heat transfer. Thus, the bar fins 22a and 22b and the heat-transfer tubes 11 disturb the air currents that flow across them and the turbulent air currents destroy boundary layers surrounding the bar fins 22a and 22b and the heat-transfer tubes 11 behind them to promote heat transfer.

Figure 34:
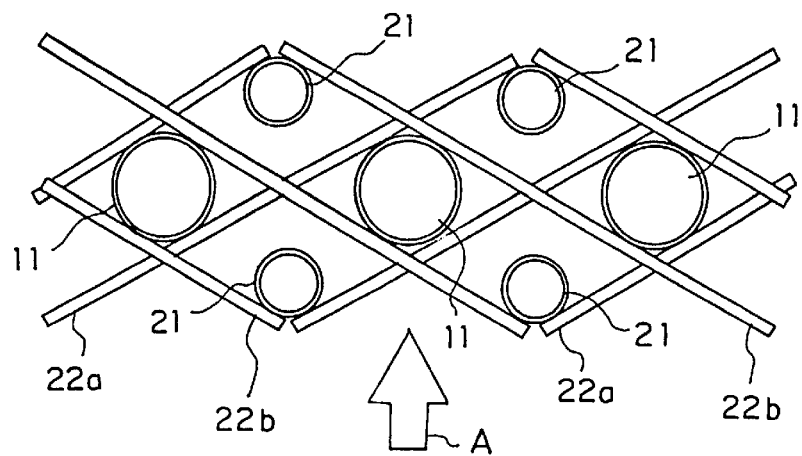
FIG. 34 is a fragmentary sectional view of the main part of a heat exchanger for an air conditioner in a twenty-seventh embodiment according to the present invention.

Referring to FIG. 34 showing a heat exchanger for an air conditioner, in a twenty-seventh embodiment according to the present invention in a fragmentary sectional view, bar fins 22a and 22b are extended relative to heat-transfer tubes 11 similarly to the bar fins 22a and 22b of the twenty-sixth embodiment, and secondary heat-transfer tubes 21 are inserted in spaces (openings) defined by the bar fins 22a and 22b in contact with the bar fins 22a and 22b.

In operation, the heat exchanger functions for heat exchanging on the same principle as that on which the heat exchanger in the twenty-sixth embodiment functions. Since the secondary heat-transfer tubes 21 are inserted in the spaces defined by the bar fins 22a and 22b, the temperature of the bar fins 22a and 22b is nearly equal to that of the heat-transfer tubes 11 and 21. Therefore, the temperature difference between the bar fins 22a and 22b and the air increases and the heat transfer efficiency of the bar fins 22a and 22b is enhanced, so that the heat exchanger enables heat exchange at a high heat exchanging quantity.

The secondary heat-transfer tubes 21 need not be inserted in all the spaces defined by the bar fins 22a and 22b, the number of the secondary heat-transfer tubes 21 is dependent on the desired heat exchanging capacity of the heat exchanger. The diameter of the secondary heat-transfer tubes 21 may be equal to or less than that of the heat-transfer tubes 11 and is dependent on the desired heat exchanging capacity and the size of the heat exchanger.

Figure 35:
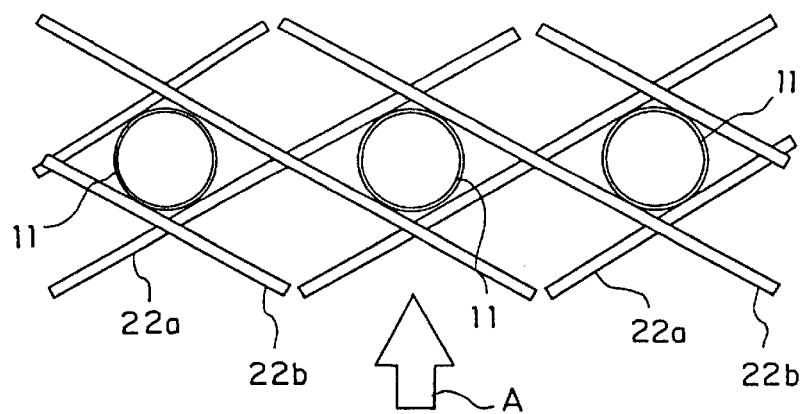
FIG. 35 is a fragmentary sectional view of the main part of a heat exchanger for an air conditioner in a twenty-eighth embodiment according to the present invention.

FIG. 35 shows a heat exchanger for an air conditioner, in a twenty-eighth embodiment according to the present invention. Although this heat exchanger is similar in appearance to the heat exchanger shown in FIG. 33 of the twenty-sixth embodiment, the heat exchanger in this embodiment is fabricated by extending bar fins 22a obliquely to the flowing direction of an air in one direction, extending bar fins 22b obliquely to the flowing direction of the air in the other direction in a lattice 22 having rhombic spaces, the plurality of lattices 22 are stacked in layers, and heat-transfer tubes 11 for passing a cooling medium are inserted in the rhombic spaces so as to be in close contact with the bar fins 22a and 22b.

Figure 36:
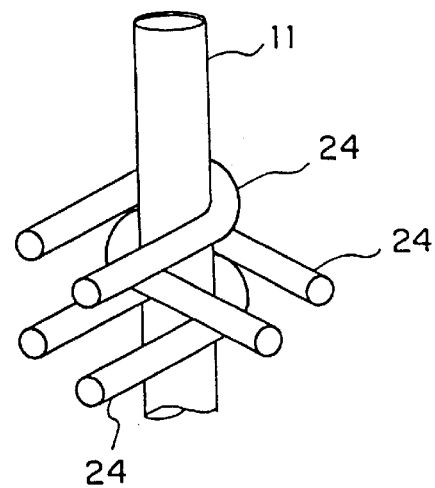
FIG. 36 is a fragmentary perspective view of the main part of a heat exchanger for an air conditioner in a twenty-ninth embodiment according to the present invention.

Referring to FIG. 36 showing a heat exchanger for an air conditioner, in a twenty-ninth embodiment according to the present invention in a fragmentary perspective view, U-shaped fins 24 are arranged axially on and attached to a heat-transfer tube 11. The alternate U-shaped fins 24 are aligned with different directions respectively. The U-shaped fins 24 may be substituted by H-shaped fins.

Figure 37:
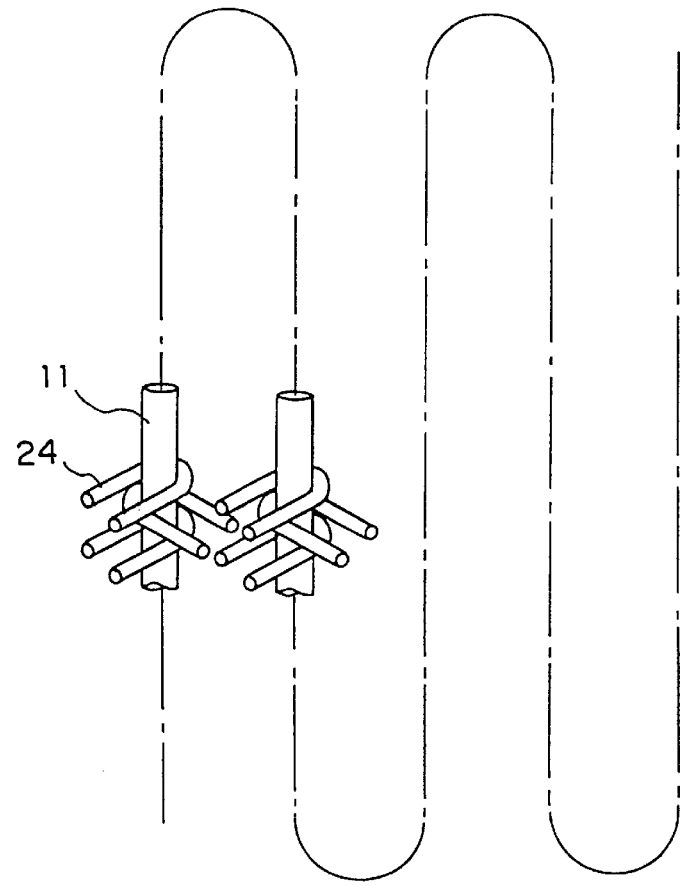
FIG. 37 is a fragmentary perspective view of one practical example of the heat exchanger in the twenty-ninth embodiment.

In operation, this heat exchanger functions for efficient heat exchanging on the same principle as that on which the heat exchanger of the twenty-sixth embodiment functions. The heat-transfer tube 11 provided with the U-shaped or the H-shaped fins can be bent as shown in FIG. 37 to form the heat exchanger in a shape similar to that of the heat exchanger in the twenty-sixth embodiment or may be bent to form the heat exchanger in a desired shape. The heat exchanging capacity of the heat exchanger can be adjusted by selectively determining the length of the U-shaped fins 24.

Figure 38:
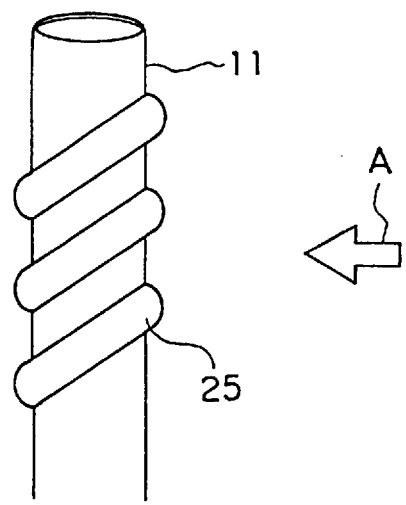
FIG. 38 is fragmentary perspective view of the main part of a heat exchanger for an air conditioner in a thirtieth embodiment according to the present invention.
Figure 39:
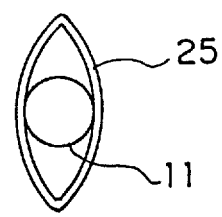
FIG. 39 is a fragmentary top plan view of the heat exchanger in the thirtieth embodiment.

Referring to FIG. 38 showing a main part of a heat exchanger for an air conditioner, in a thirtieth embodiment according to the present invention in a fragmentary perspective view, a plurality of circular fins 25 are put on in an axially arrangement on and attached to a heat-transfer tube 11. The circular fins 25 may be set in close contact with the heat-transfer tube 11 by staining the same as shown in FIG. 39 or by soldering the circular fins 25 to the heat-transfer tube 11. In the drawing, air flow direction is indicated by numeral 3.

In operation, parts of the circular fins 25 facing air currents disturb the air currents and turbulent air currents strikes on other parts of the circular fins 25 and the heat-transfer tubes to destroy boundary layers surrounding the other parts of the circular fins 25 and the heat-transfer tubes 11 to enhance heat transfer efficiency. Thus, air currents are disturbed and the turbulent air currents strike on the heat-transfer surfaces to promote heat transfer.

Figure 40:
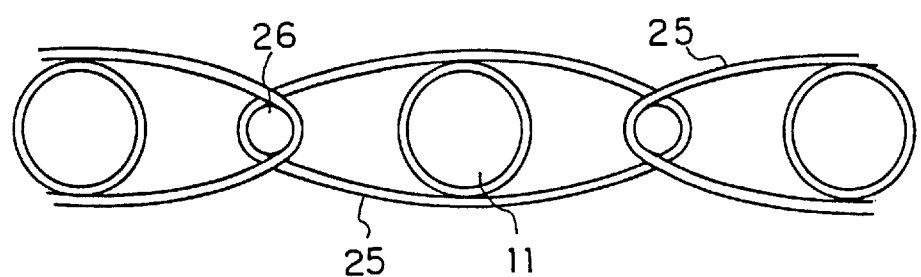
FIG. 40 is a fragmentary plan view of the main part of a heat exchanger for an air conditioner in a thirty-first embodiment according to the present invention.

Referring to FIG. 40 showing a heat exchanger for an air conditioner, in a thirty-first embodiment according to the present invention in a fragmentary sectional view, there exist heat-transfer tubes 11, circular fins 25 and spacing tubes or bars 26 for defining intervals of heat-transfer tubes 11. The tubes or bars 26 can be changed to the heat-transfer tubes 11 and diameters of the tubes or bars 26 may be different from those of the heat-transfer tubes 11 as shown in the drawings. The heat-transfer tubes 11 are arranged so that the circular fins 25 put on the adjacent heat-transfer tubes 11 overlap each other, the spacing tubes or bars 26 are inserted in spaces defined by the overlapping portions of the circular fins 25, and then the heat-transfer tubes 11 at the opposite ends are pulled away from each other so that the circular fins 25 are strained, and the tubes or bars 26 and the heat-transfer tubes 11 are attached to the circular fins 25. As the heat-transfer tubes 11 at the opposite ends are pulled away from each other, the circular fins 25 are held the heat-transfer tubes 11 and the spacing tubes or bars 26 firmly. Thus, contact resistance for heat is reduced when heat transfer is executed, and this heat exchanger can easily be produced. The operation of this heat exchanger is the same as that of the heat exchanger in the thirtieth embodiment.

Figure 41:
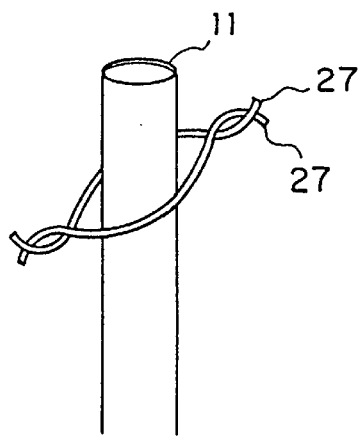
FIG. 41 is a fragmentary perspective view of the main part of a heat exchanger for an air conditioner in a thirty-second embodiment according to the present invention.

Referring to FIG. 41 showing a heat exchanger for an air conditioner, in a thirty-second embodiment according to the present invention in a fragmentary perspective view, two fine wires are extended on the opposite sides of a heat-transfer tube 11 respectively, and the corresponding end portions of the two fine wires are intertwisted to form a pair of fine wire fins 27. This heat exchanger is the same in construction as the heat exchanger in the thirtieth embodiment. The two fine wires are intertwisted properly so that the fine wire fins 27 hold firmly to the heat-transfer tube 11 so that the thermal resistance of the contact between the fine wire fins 27 and the heat-transfer tube 11 is small. The operation of this heat exchanger is the same as that of the heat exchanger in the thirtieth embodiment. The length of the fine wire fins 27 is determined properly so that a necessary heat-transfer area can be secured.

Figure 42:
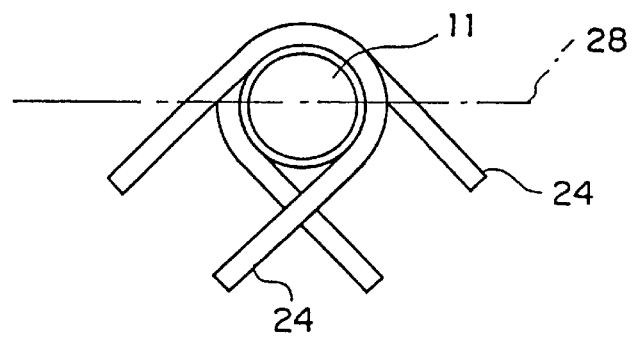
FIG. 42 is a fragmentary sectional view of the main part of a heat exchanger for an air conditioner in a thirty-third embodiment according to the present invention.

FIG. 42 shows a heat exchanger for an air conditioner, in a thirty-third embodiment according to the present invention in a fragmentary sectional view. The heat exchanger comprises U-shaped fins 24 which edges are positioned below a horizontal plane 28 including the axes of the heat-transfer tubes 11 by modifying a posture of the heat exchanger in the twenty-ninth embodiment.

If the temperature of the U-shaped fins 24 is lower than the dew point of air flowing through the heat exchanger, moisture contained in the air condenses in water droplets on the surfaces of the U-shaped fins 24. Since the U-shaped fins 24 extend below the horizontal plane 28, condensed water droplets collect at the extremities of the U-shaped fins 24 and drop by gravity. End portions of the U-shaped fins 24 may be bent downward instead of installing the heat exchanger so that the U-shaped fins 24 extend below the horizontal plane 28. The heat exchanger may be provided with H-shaped fins instead of the U-shaped fins 24.

In the thirty-fourth embodiment, in the heat exchanger, for example, the heat-transfer tubes 11 and the fins 22a and 22b in the twenty-sixth embodiment shown in FIG. 33, are formed of different materials having different contact angles respectively. If the contact angle of the heat-transfer tubes 11 is smaller than that of the fins 22a and 22b, the heat-transfer tubes 11 are more hydrophilic than the fins 22a and 22b. Therefore, condensed water droplets are attracted to and gather on the heat-transfer tubes 11, the gathered water droplets grow into greater water droplets and greater water droplets drain off along the heat-transfer tubes 11. If the contact angle of the fins 22a and 22b is smaller than that of the heat-transfer tubes 11, the fins 22a and 22b are more hydrophilic than the heat-transfer tubes 11. Therefore, condensed water droplets are attracted to and gather on the fins 22a and 22b, the water droplets grow into greater water droplets, and large water droplets drop by gravity or, if the velocity of the air currents is high, large water droplets can easily be blown off the fins 22a and 22b by the air currents. Consequently, increase in pressure loss attributable to condensed water droplets adhering to the heat exchanger can be suppressed, reduction in heat-transfer efficiency attributable to water droplets wetting the heat exchanger can be prevented, and the original heat-transfer performance of the heat exchanger can be maintained. This technical idea is applicable also to the twenty-seventh to the thirty-third embodiment.

In the thirty-fifth embodiment, the surfaces of the heat-transfer tubes and the fins may be finished by surface treatment to make the respective surfaces of the heat-transfer tubes and the fins different in contact angle from each other. For example, the surfaces of the fins may be finished by a hydrophobic process and the surfaces of the heat-transfer tubes may be finished by a hydrophilic process, and vice versa. When the surfaces of the heat-transfer tubes and the fins are thus finished by surface treatment, condensed water droplets can readily be drained and the adverse effect of condensed water droplets on the heat exchanging performance of the heat exchanger can be eliminated. Consequently, the original heat exchanging performance of the heat exchanger can be maintained. The effects of the combination of the surface-treated heat-transfer tubes and the surface-treated fins are the same as those of the combination of the heat-transfer tubes 11 and the fins 22a and 22b formed of different materials differing in contact angle from each other respectively of the thirty-fourth embodiment.

Figure 43:
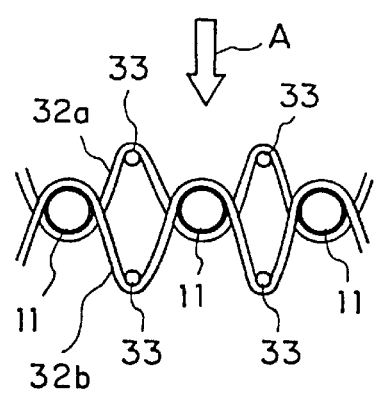
FIG. 43 is a fragmentary sectional view of the main part of a heat exchanger for an air conditioner in a thirty-sixth embodiment according to the present invention.

Referring to FIG. 43 showing a principal part of a heat exchanger for an air conditioner, in a thirty-sixth embodiment according to the present invention in a fragmentary sectional view, heat-transfer tubes 11 are arranged at predetermined intervals to pass an internal fluid, such as a cooling medium. Fine wire fins 32a, 32b are passed over the heat-transfer tubes. Support bars 33 are arranged at predetermined intervals equal to the predetermined intervals between the heat-transfer tubes 11 in the perpendicular direction to the air flow A. Each support bar 33 is sifted by half interval from the heat-transfer tubes 11, and arranged so as to sandwich the heat-transfer tubes 11 from upper and lower sides of the air flow A. Fine wire fins 32a are passed alternately over the heat-transfer tubes 11 and the support bars 33 which are located at the upper sides of the air flow, and fine wire fins 32b are passed alternately over the heat-transfer tubes 11 and the support bars 33 which are located at the lower side of the air flow. The fine wire fins 32a, 32b are arranged alternately each other.

In operation, air is unable to flow straight toward the heat-transfer tubes 11 and thread its way through spaces between the fine wire fins 32a and 32b, the support bars 33 and the heat-transfer tubes 11. While air flows through those spaces, minute vortices are generated. The vortices swirl around the fine wire fins 32b, the support bars 33 and the heat-transfer tubes 11 in turbulent currents to promote heat transfer, so that the heat exchanger transfers heat at a high heat-transfer rate. Since the fine wires are wound around the support bars 33, the fine wire fins 32a and 32b cross each other at a large crossing angle in a plane perpendicular to the axes of the heat-transfer tubes 11. Therefore, water droplets condensed on the heat exchanger are hardly able to stay on the fine wire fins 32a and 32b, the heat exchanger is hardly clogged with condensed water droplets and hence reduction in heat exchanging quantity due to reduction in the flow of air can be suppressed even if the heat exchanger is used under a condition where moisture contained in the atmosphere condenses.

Figure 44:
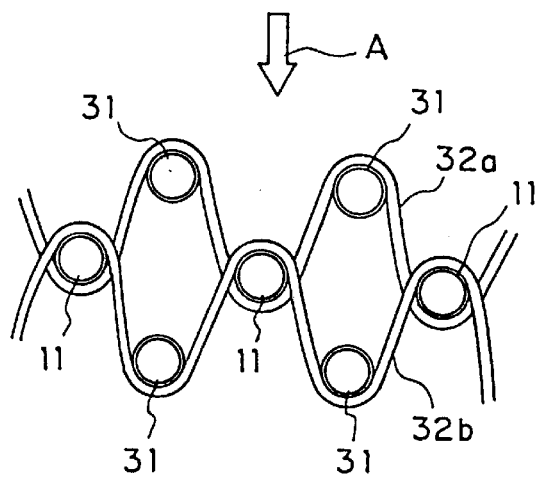
FIG. 44 is a fragmentary sectional view of the main part of a heat exchanger for an air conditioner in a thirty-seventh embodiment according to the present invention.

FIG. 44 shows a principal part of a heat exchanger for an air conditioner, in a thirty-seventh embodiment according to the present invention in a fragmentary sectional view. This heat exchanger is similar in construction to the heat exchanger in the thirty-sixth embodiment, except that the former is provided with heat-transfer tubes 31 instead of the support bars 33. In this heat exchanger, there are three roes comprising a row of the heat-transfer tubes 11, a row of the heat-transfer tubes 31 and a row of the other heat-transfer tubes 11. The heat-transfer tubes 31 are sifted half the pitch from the heat-transfer tubes 11, so that the heat-transfer tubes 11 and 31 are arranged in a staggered arrangement. The heat exchanger, similarly to the heat exchanger in the thirty-sixth embodiment, exchanges heat efficiently. Since this heat exchanger is provided with the heat-transfer tubes 31 instead of the support bars 33 of the thirty-sixth embodiment, the heat transfer efficiency of the fine wire fins 32a and 32b is enhanced for further efficient heat transfer. The diameter of the heat-transfer tubes 31 may be equal to or different from that of the heat-transfer tubes 11.

Figure 45:
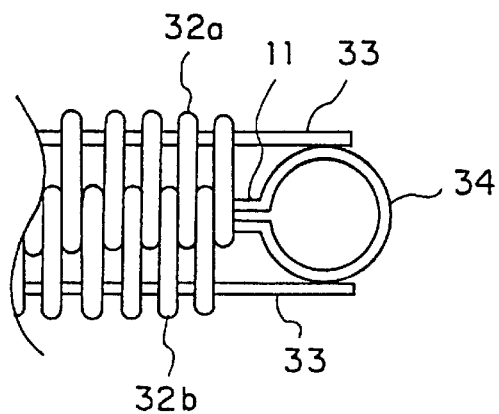
FIG. 45 is a fragmentary side view of the main part of a heat exchanger for an air conditioner in a thirty-eighth embodiment according to the present invention.

FIG. 45 shows a principal part of a heat exchanger for an air conditioner, in a thirty-eighth embodiment according to the present invention in a fragmentary side view. Shown in FIG. 45 are a heat-transfer tube 11, fine wire fins 32a and 32b, support bars 33 and a header 34. This heat exchanger is constructed by connecting the headers 34 to the heat exchanger of the thirty-sixth embodiment. The header 34 distributes an internal fluid to the heat-transfer tubes 11, and the internal fluid flows through the heat-transfer tubes 11 into the ocher header 34. The support bars 33 are fixed to the outer surfaces of the headers 34 by brazing or the like and are supported firmly on the headers 34 so as to withstand stress induced by the tension of the fine wire fins 32a and 32b. The headers 34 need not necessarily be round tubes as shown in FIG. 45. This heat exchanger, similarly to the heat exchanger in the thirty-sixth embodiment shown in FIG. 43, exchanges heat efficiently.

Figure 46:
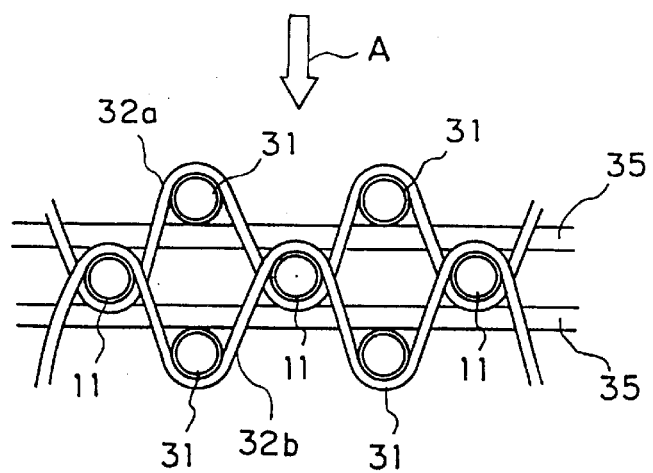
FIG. 46 is a fragmentary sectional view of the main part of a heat exchanger in a thirty-ninth embodiment according to the present invention.

FIG. 46 shows a principal part of heat exchanger for an air conditioner, in a thirty-ninth embodiment according to the present invention in a fragmentary sectional view. This heat exchanger is constructed by extending support bars 35 perpendicularly to the heat-transfer tubes 11 and 31 between the front row of the heat-transfer tubes 31 and the row of the heat-transfer tubes 11 and between the row of the heat-transfer tubes 11 and the rear row of the heat-transfer tubes 31 of the heat exchanger in the thirty-seventh embodiment. The support bars 35 are arranged axially of the heat-transfer tubes 11 at suitable pitches. The heat exchanger including this heat exchanger, similarly to the heat exchanger in the thirty-sixth embodiment shown in FIG. 43, exchanges heat efficiently. Since the heat-transfer tubes 11 and 31 are fixedly held in place by the support bars 35, the heat exchanger can easily be produced, the heat-transfer tubes 11 and 31 can be arranged at accurate pitches and heat exchanger has a firm construction.

Figure 47:
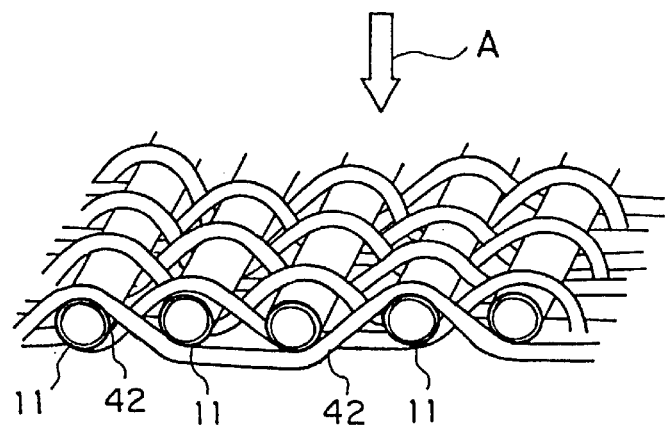
FIG. 47 is a fragmentary perspective view of the main part of a heat exchanger for an air conditioner in a fortieth embodiment according to the present invention.

Referring to FIG. 47 showing a principal part of a heat exchanger for an air conditioner, in a fortieth embodiment according to the present invention in a fragmentary perspective view, heat-transfer tubes 11 are arranged in parallel to each other at predetermined intervals, and fine wire fins 42 are passed alternately over and under the heat-transfer tubes 11. Some of the fine wire fins 42 are skipped a row or a few rows of the heat-transfer tubes 11 to facilitate the draining off of condensed water droplets when they are arranged over and under heat-transfer tubes 11. Therefore, the heat exchanger is hardly clogged with condensed water droplets when the heat exchanger is used under a condition where moisture contained in the atmosphere condenses on the heat exchanger and hence reduction in heat exchanging quantity due to reduction in the flow of air can be suppressed. This heat exchanger exchanges heat efficiently on substantially the same principle as that on which the heat exchanger in the thirty-sixth embodiment shown in FIG. 43 operates.

Figure 48:
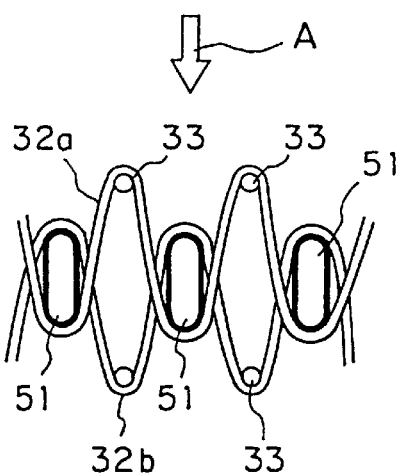
FIG. 48 is a fragmentary sectional view of the main part of a heat exchanger for an air conditioner in a forty-first embodiment according to the present invention.

FIG. 48 shows a principal part of a heat exchanger for an air conditioner, in a forty-first embodiment according to the present invention in a fragmentary sectional view. This heat exchanger is similar in construction to the heat exchanger in the thirty-sixth embodiment, except that the former is provided with flat heat-transfer tubes 51 instead of the heat-transfer tubes 11. The flat heat-transfer tubes 51 are disposed with their width aligned with the flowing direction of air indicated by the arrow A. This heat exchanger, similarly to the heat exchanger in the sixteenth embodiment, is hardly clogged with condensed water droplets even if the same is used under a condition where moisture contained in the atmosphere condenses on the heat exchanger. Since the heat-transfer tubes 51 are flat, the fine wire fins cross each other at a large crossing angle. Therefore, condensed water drops are hardly able to stay on the heat exchanger and hence the heat exchanger is hardly clogged with condensed water droplets. Consequently, the pressure loss of air is reduced and reduction in heat exchanging quantity due to reduction in the flow of air can be suppressed. Heat-transfer tubes having an elliptic cross section may be used instead of the flat heat-transfer tubes 51. The heat exchangers in the thirty-seventh to the fortieth embodiment may be provided with the flat heat-transfer tubes 51 instead of the round heat-transfer tubes.

Figure 49:
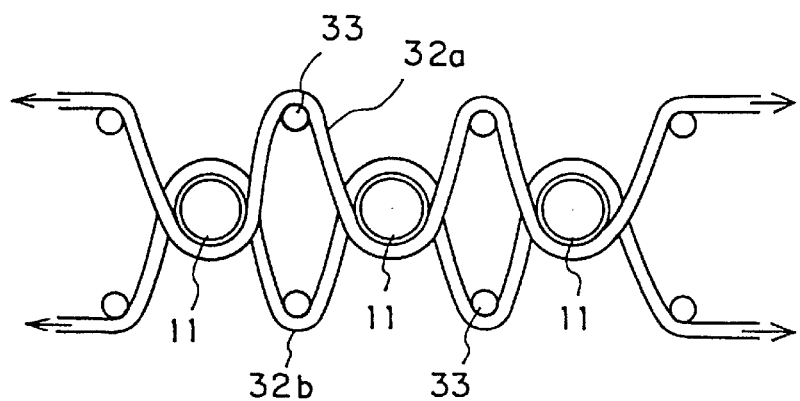
FIG. 49 is a fragmentary sectional view of the main part of a heat exchanger for an air conditioner in a forty-second embodiment according to the present invention.

FIG. 49 shows a principal part of a heat exchanger for an air conditioner, in a forty-second embodiment according to the present invention in a fragmentary sectional view. This heat exchanger is similar in construction to the heat exchanger in the thirty-sixth embodiment shown in FIG. 43. In this heat exchanger, the fine wire fins 32a and 32b are tensions so that the fine wire fins 32a and 32b are in close contact with the heat-transfer tubes 11 and the support bars 33. This technical idea is applicable to the heat exchangers in the thirty-seventh to the fortieth embodiment.

Figure 50:
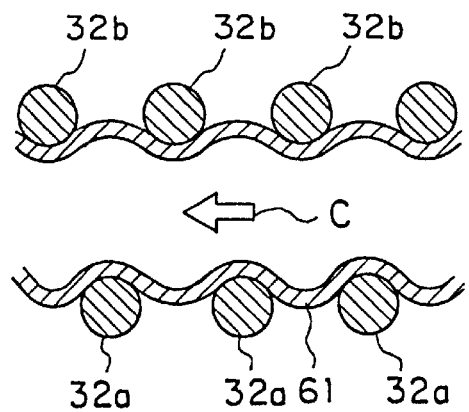
FIG. 50 is a fragmentary longitudinal sectional view of a heat exchanger for an air conditioner in a forty-third embodiment according to the present invention.

FIG. 50 shows a part of a heat exchanger for an air conditioner around a heat-transfer tube, in a forty-third embodiment according to the present invention in a fragmentary longitudinal sectional view. This heat exchanger is similar in construction to the heat exchanger in the thirty-sixth embodiment shown in FIG. 43, except that the former is provided with soft heat-transfer tubes 61. Fine wire fins 32a, 32b are passed alternately over and under the heat-transfer tubes 61 under tension so that the walls of the heat-transfer tubes 61 are depressed in grooves and the fine wire fins 32a and 32b sink in the grooves in close contact with the heat-transfer tubes 61. Thus, thermal resistance at the positions of contact between the heat-transfer tubes 61 and the fine wire fins 32a and 32b is reduced and the undulating inner surfaces of the heat-transfer tubes 61 promotes heat transfer. An internal fluid flows through the heat-transfer tubes 61 in the direction of the arrow C. This technical idea is applicable to the heat exchangers in the thirty-seventh to the forty-second embodiment.

Figure 51:
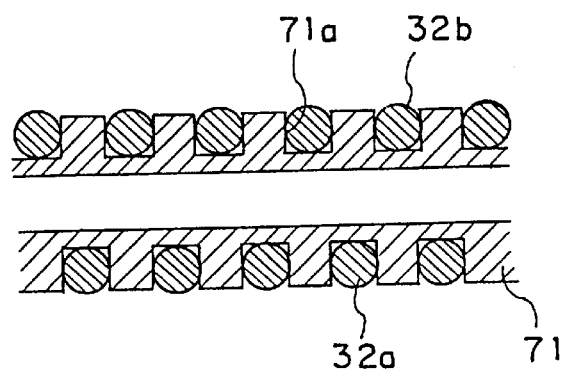
FIG. 51 is a fragmentary longitudinal sectional view of a heat exchanger for an air conditioner in a forty-fourth embodiment according to the present invention.

FIG. 51 is a fragmentary longitudinal sectional view a part of a heat exchanger for an air conditioner around a heat-transfer tube, in a forty-fourth embodiment according to the present invention. A heat-transfer tube 71 is provided with recesses 71a in its outer circumference. Fine wire fins 32a, 32b are passed alternately over and under the heat-transfer tubes 71 so as to be fixedly fitted in the recesses 71a formed in the outer circumferences of the heat-transfer tubes 71. This construction reduces thermal resistance at positions of contact between the heat-transfer tubes 71 and the fine wire fins 32a and 32b. The grooves 71a facilitate the fixation of the fine wire fins 32a and 32b and the production of the heat exchanger. The pitches of the recesses 71a are determined selectively to determine the pitches of the fine wire fins. This technical idea is applicable to the heat exchangers in the thirty-seventh to the forty-second embodiment.

Figure 52:
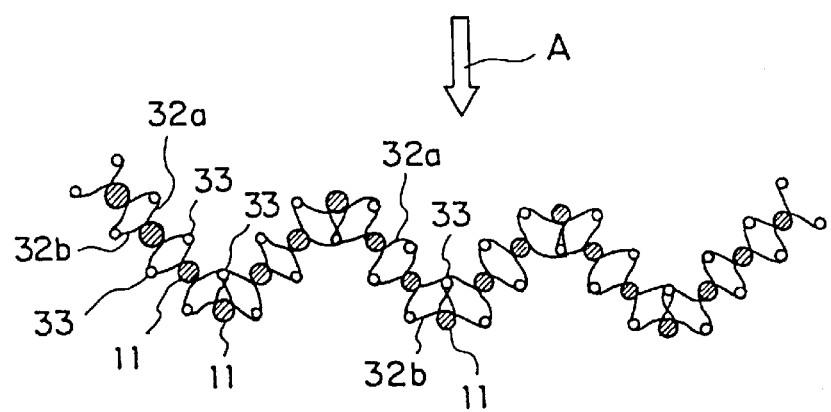
FIG. 52 is a fragmentary sectional view of a heat exchanger for an air conditioner in a forty-fifth embodiment according to the present invention.

FIG. 52 is a fragmentary schematic sectional view of a heat exchanger for an air conditioner, in a forty-fifth embodiment according to the present invention. This heat exchanger is formed by bending the heat exchanger in the thirty-sixth embodiment shown in FIG. 43 in a corrugated shape. As shown in FIG. 52, a plurality of heat transfer tubes 11, fine wire fins 32a and 32b and a plurality of support bars 33 are assembled so as to form a corrugated heat-transfer surface. The ratio of the heat-transfer area to the frontal area of this heat exchanger is large and hence this heat exchanger is capable of operating at a high heat exchanging efficiency. The heat exchangers in the thirty-seventh to the forty-fourth embodiment may be formed in a corrugated shape for the same purpose.

Figure 53:
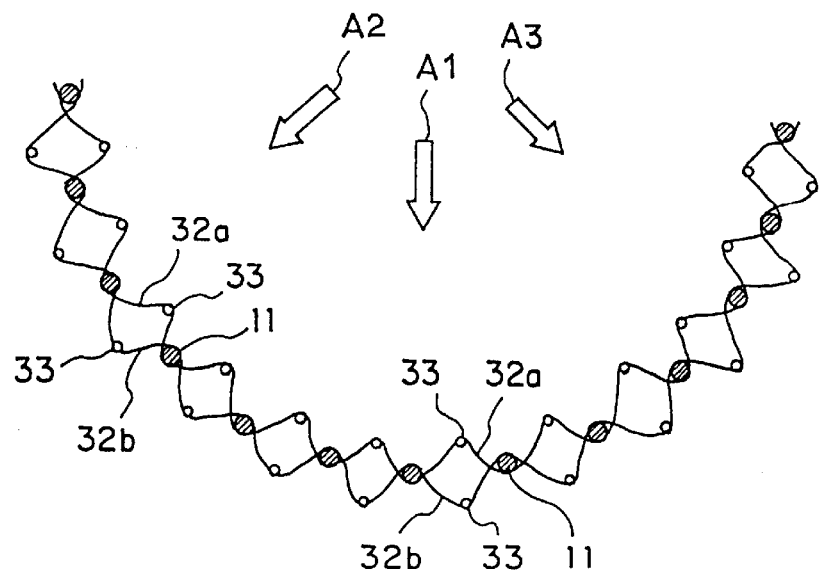
FIG. 53 is a fragmentary sectional view of a heat exchanger for an air conditioner in a forty-sixth embodiment according to the present invention.

FIG. 53 is a principal part of a fragmentary schematic sectional view of a heat exchanger for an air conditioner, in a forty-sixth embodiment according to the present invention. This heat exchanger is formed by curving the heat exchanger in the thirty-sixth embodiment shown in FIG. 43 in a semicircular shape. The ratio of the heat-transfer area to the frontal area of this heat exchanger is large and the heat exchanger operates at a high heat exchanging efficiency. The heat exchanger may be formed in any suitable shape other than the semicircular shape, depending on the flowing directions of air indicated by the arrows A1 to A3 and the characteristics of the blower. The heat exchangers in the thirty-seventh to the forty-fourth embodiment may be formed in a semicircular shape for the same purpose.

Figure 54:
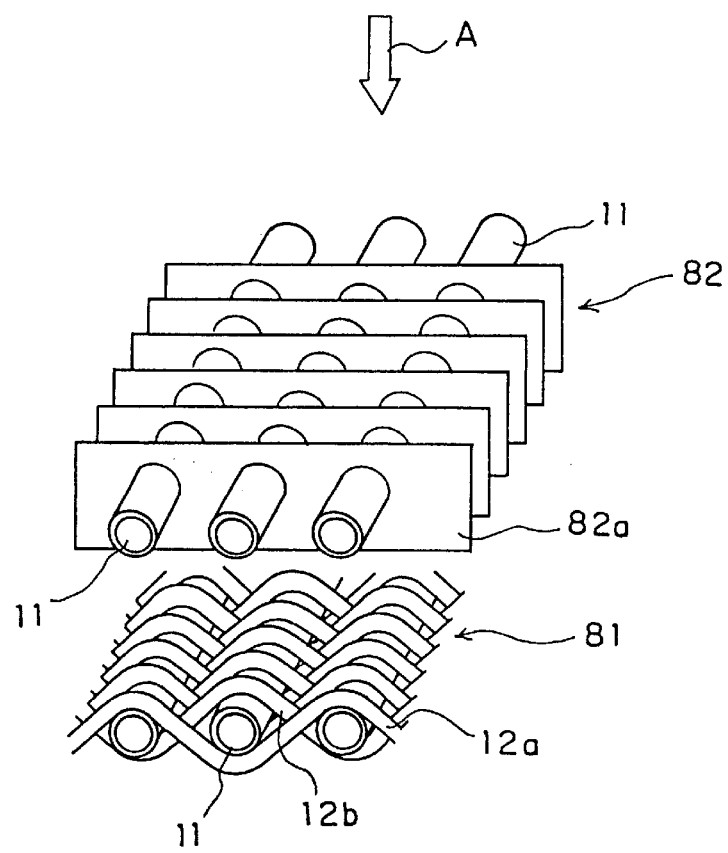
FIG. 54 is a fragmentary perspective view of the main part of a heat exchanger for an air conditioner in a forty-seventh embodiment according to the present invention.

FIG. 54 is a fragmentary perspective view of a heat exchanger for an air conditioner, in a forty-seventh embodiment according to the present invention. This heat exchanger comprises a wire-fin-tube heat exchanging unit 81 and a plate-fin-tube heat exchanging unit 82. The wire-fin-tube heat exchanging unit 81 and the plate-fin-tube heat exchanging unit 82 are disposed close to each other. The wire-fin-tube heat exchanging unit 81 is fabricated by arranging a plurality of heat-transfer tubes 11 in a row at predetermined intervals and passing fine wire fins 12a, 12b alternately over and under the heat-transfer tubes 11 so that the fine wire fins 12a and 12b are arranged close to each other. The plate-fin-tube heat exchanging unit 82 is fabricated by assembling heat-transfer tubes 11 arranged at predetermined intervals and a plurality of plate fins 82a arranged at predetermined intervals. It is important that the plate-fin-tube heat exchanging unit 82 is disposed on the upper side with respect to the flowing direction of air indicated by the arrow A, and the wire-fin-tube heat exchanging unit 81 is disposed on the lower side with respect to the flowing direction of air.

In operation, first the plate-fin-tube heat exchanging unit 82 exchanges heat with air at a high heat-transfer rate owing to its leading-edge effect, and then the wire-fin-tube heat exchanging unit 81 exchanges heat at a high heat-transfer efficiency owing to the effect of vortices generated in spaces between the heat-transfer tubes 11 and the fine wire fins 12a and 12b. Thus, the heat exchanger has a high mean heat-transfer rate. Even if the heat exchanger is used under a condition where moisture contained in the atmosphere condenses on the heat exchanger, most part of the moisture condenses on the plate fins 82a to prevent clogging the wire-fin-tube heat exchanging unit 81 disposed on the lower side with condensed water droplets. The ratio of the heat-transfer area to the frontal area of the heat exchanger comprising, in combination, the plate-fin-tube heat exchanging unit 82 having a large heat-transfer area per unit frontal area and the wire-fin-tube heat exchanging unit 81 is greater than that of a heat exchanger comprising two wire-fin-tube heat exchanging units 81.

Figure 55:
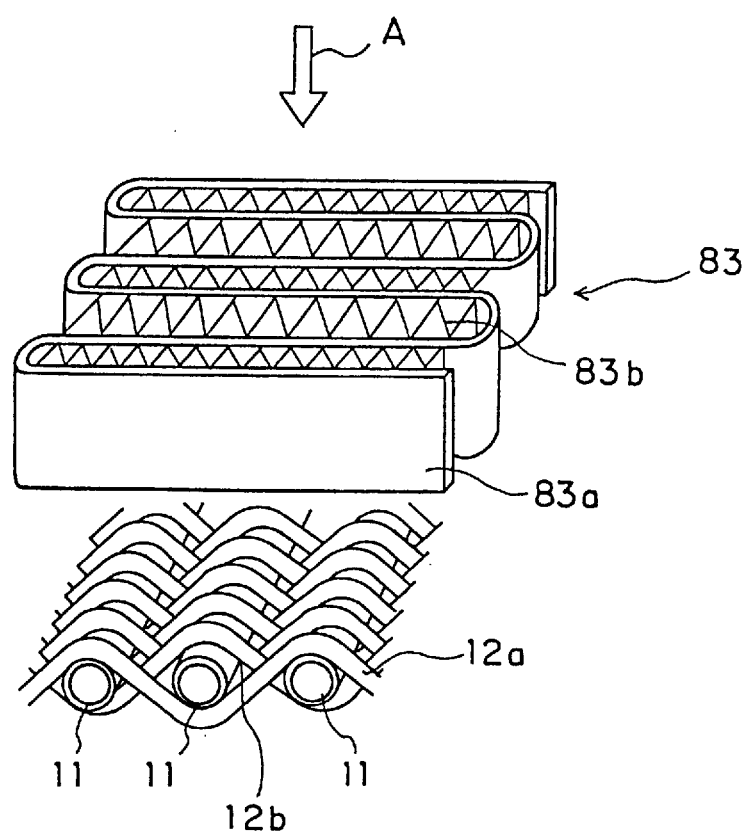
FIG. 55 is a fragmentary perspective view of the main part of a heat exchanger for an air conditioner in a forty-eighth embodiment according to the present invention.

FIG. 55 is a fragmentary perspective view of a heat exchanger for an air conditioner, in a forty-eighth embodiment according to the present invention. This heat exchanger comprises a wire-fin-tube heat exchanging unit 81 and a corrugated-fin-tube heat exchanging unit 83 in combination. The wire-fin-tube heat exchanging unit 81 and the corrugated-fin-tube heat exchanging unit 83 are disposed close to each other. The corrugated-fin-tube heat exchanging unit 83 is formed by attaching corrugated fins 83b to a flat heat transfer tube 83a. It is important that the corrugated-fin-tube heat exchanging unit 83 is disposed on the upper side with respect to the flowing direction of air indicated by the arrow A, and the wire-fin-tube heat exchanging unit 81 is disposed on the lower side with respect to the flowing direction of air. The operation and effect of this heat exchanger is the same as those of the heat exchanger in the forty-seventh embodiment.

Figure 56:
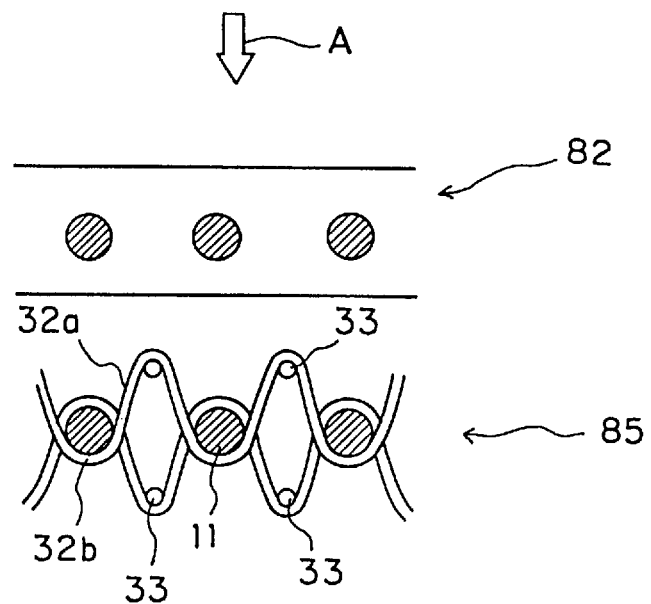
FIG. 56 is a fragmentary sectional view of the main part of a heat exchanger for an air conditioner in a forty-ninth embodiment according to the present invention.

FIG. 56 is a fragmentary sectional view of a heat exchanger for an air conditioner, in a forty-ninth embodiment according to the present invention. This heat exchanger comprises a plate-fin-tube heat exchanging unit 82 and a wire-fin-tube heat exchanging unit 85 similar to the heat exchanger in the thirty-sixth embodiment shown in FIG. 43. The plate-fin-tube heat exchanging unit 82 and the wire-fin-tube heat exchanging unit 85 are disposed close to each other. The plate-fin-tube heat exchanging unit 82 is disposed on the upper side with respect to the flowing direction of air indicated by the arrow A, and the wire-fin-tube heat exchanging unit 85 is disposed on the lower side with respect to the flowing direction of air.

Since this heat exchanger employs the heat exchanger in the thirty-sixth embodiment, the heat exchanging efficiency of this heat exchanger is higher than that of the heat exchanger in the forty-seventh embodiment shown in FIG. 54.

Figure 57:
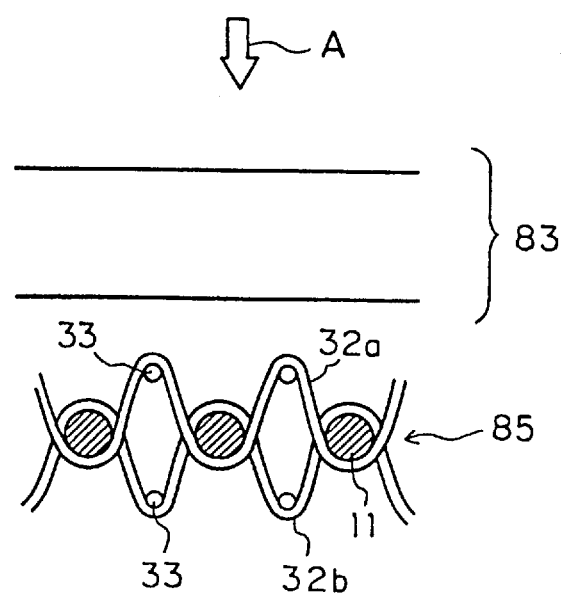
FIG. 57 is a fragmentary sectional view of the main part of a heat exchanger for an air conditioner in a fiftieth embodiment according to the present invention.

FIG. 57 is a fragmentary sectional view of a principal part of a heat exchanger for an air conditioner, in a fiftieth embodiment according to the present invention. This heat exchanger comprises a corrugated-fin-tube heat exchanging unit 83 and a wire-fin-tube heat exchanging unit 85 similar to the heat exchanger in the sixteenth embodiment. The corrugated-fin-tube heat exchanging unit 83 and the wire-fin-tube heat exchanging unit 85 are disposed close to each other. The corrugated-fin-tube heat exchanging unit 83 is disposed on the upper side with respect to the flowing direction of air indicated by the arrow A, and the wire-fin-tube heat exchanging unit 85 is disposed on the lower side with respect to the flowing direction of air. Since this heat exchanger employs the heat exchanger in the thirty-sixth embodiment shown in FIG. 43, the heat exchanging efficiency of this heat exchanger is higher than that of the heat exchanger of the heat exchanger in the forty-eighth embodiment shown in FIG. 55.

As is apparent from the foregoing description, the present invention has the following effects.

Since the heat exchanger in a preferred mode of the present invention comprises the plurality of heat-transfer tubes arranged at predetermined intervals, and the fine wire fins formed by helically winding fine wires around the heat-transfer tubes, the flow velocity of the air increases and the flow of the air is disturbed three-dimensionally as the air flows through the heat exchanger. Consequently, the rate of heat transfer between the air and the heat exchanger increases and heat transfer is promoted. Since the fine wire fins are formed by helically winding fine wires around the heat-transfer tubes, comparatively large spaces are formed in a plane perpendicular to the flowing direction of air and the fine wire fins hardly obstruct the draining of water droplets condensed on the heat exchanger along the heat-transfer tubes and hence condensed water droplets are hardly able to stay on the heat exchanger. Accordingly, the heat exchanger is hardly clogged with water droplets and reduction in heat exchanging quantity due to reduction in the flow of air can be suppressed even if the heat exchanger is used under a condition where moisture contained in the atmosphere condenses.

Since the heat exchanger in a preferred mode of the present invention comprises the plurality of heat-transfer tubes arranged at predetermined intervals, and the fine wire fins formed by winding a fine wire around each of pairs of adjacent heat-transfer tubes, the flow velocity of the air increases and the flow of the air is disturbed three-dimensionally as the air flows through the heat exchanger. Consequently, the rate of heat transfer between the air and the heat exchanger increases and heat transfer is promoted.

Since comparatively large spaces are formed in a plane perpendicular to the axes of the heat-transfer tubes, water droplets condensed on the heat exchanger are hardly able to stay on the heat exchanger. Therefore, the heat exchanger is hardly clogged with condensed water droplets and reduction in heat exchanging quantity due to reduction in the flow of air can be suppressed even if the heat exchanger is used under a condition where moisture contained in the atmosphere condenses.

Since the heat exchanger for an air conditioner, in a preferred mode of the present invention comprises the plurality of heat transfer tubes arranged at predetermined intervals, and the fine wire fins formed by helically winding at least one fine wire around the two adjacent heat-transfer tubes so as to interconnect all the heat-transfer tubes, the flow velocity of the air increases and the flow of the air is disturbed three-dimensionally when the air flows through the heat exchanger. Consequently, the rate of heat transfer between the air and the heat exchanger increases and heat transfer is promoted. Since the fine wire fins are formed by helically winding fine wires around the heat-transfer tubes, the fine wire fins do not cross each other in a plane perpendicular to the axes of the heat-transfer tubes, comparatively large spaces are formed in a plane perpendicular to the flowing direction of air and the fine wire fins hardly obstruct the axial flow of water droplets along the heat-transfer tubes. Therefore, the heat exchanger is hardly clogged with condensed water droplets and reduction in heat exchanging quantity due to reduction in the flow of air can be suppressed even if the heat exchanger is used under a condition where moisture contained in the atmosphere condenses. When the fine wires are wound helically at a large helical angle around the heat-transfer tubes, the heat-transfer area of the heat exchanger is greater than that of a heat exchanger in which fine wires are passed alternately over and under the heat-transfer tubes and the fine wires are arranged at the same pitch as that of the helically wound fine wires.

The heat exchanger for an air conditioner, in a preferred mode of the present invention comprises the plurality of heat-transfer tubes arranged at predetermined intervals, and the fine wire fins formed by passing fine wires having a cross section other than a circular cross section alternately over and under the heat-transfer tubes. Since the surface area of the fine wire fin having a cross section other than a circular cross section is greater than that of a fine wire fin having a circular cross section and the same sectional area, the fine wire fins have an increased heat-transfer area, which increases heat exchanging quantity. Since the grooves of the fine wire fins facilitate the draining of condensed water droplets, the heat exchanger is hardly clogged with condensed water droplets and pressure loss is reduced even if the surface of the heat exchanger is wet during operation. Consequently, reduction in heat exchanging quantity due to reduction in the flow of air can be suppressed.

According to the present invention, when a plurality of heat exchangers for an air conditioner, each formed by interlacing heat-transfer tubes and fine wire fins so that a wavy heat-transfer surface is formed are used in combination, the heat-transfer surfaces are arranged in a plurality of banks so that the ridges of the heat-transfer surface on the lower side protrude into the furrows of the heat-transfer surface on the upper side. Therefore, the heat exchangers arranged in a plurality of banks have an increased heat-transfer area, increases heat exchanging quantity and requires a comparatively small space for installation.

Since the heat exchanger for an air conditioner, in a preferred mode of the present invention is provided with the ring fins of a diameter greater than the outside diameter of the heat-transfer tubes, and the ring fins are put on the heat-transfer tubes so that part of the inner circumference of each ring fin is in contact with the outer circumference of the heat-transfer tube, the flow of the air is obstructed by portions of the ring fins protruding toward the upper side and the lower side with respect to the flowing direction of air, the air is unable to flow straight through the core of the heat exchanger and threads its way through the spaces between the ring fins and between the ring fins and the heat-transfer tubes, the flow velocity of the air increases as the air flows through those spaces and vortices are formed in the flow of the air. Consequently, the rate of heat transfer between the heat exchanger and the air is increased and heat transfer is promoted. Furthermore, since the heat exchanger has a large heat-transfer area with respect to the flowing direction of air, heat exchanging quantity can be increased. Since the spaces between the heat-transfer tubes and the ring fins are large, water droplets condensed on the heat exchanger are hardly able to stay on the heat exchanger even if the heat exchanger is used under a condition where moisture contained in the atmosphere condenses, the heat exchanger is scarcely clogged with condensed water droplets and reduction in heat exchanging quantity due to reduction in the flow of air can be suppressed, and the pressure loss of air is reduced.

According to the present invention, since each ring fin is fixedly joined to the adjacent ring fin at least at one position, the heat-transfer surface has a firm construction, the heat-transfer tubes can be arranged at reduced intervals, and the heat-transfer area can be increased by a simple construction. Since the centers of the ring fins are dislocated from the axes of the heat-transfer tubes toward the upper side with respect to the flowing direction of the air, the flow of the air is disturbed on the upper side of the heat-transfer tubes and turbulent currents of the air act on the heat-transfer tubes, so that heat exchanging quantity can be increased. Since spaces are formed between the ring fins and the heat-transfer tubes at positions other than those where the ring fins and the heat-transfer tubes are in contact with each other, water droplets condensed on the heat exchanger are hardly able to stay on the heat exchanger, the heat exchanger is hardly clogged with condensed water droplets even if the surface of the heat exchanger is wet during operation, and reduction in heat exchanging quantity due to reduction in the flow of air can be suppressed.

According to the present invention, a portion of one ring fin on the upper side with respect to the flowing direction of the air is fixed to the outer surface of the heat-transfer tube and a portion of the other ring fin on the lower side with respect to the flowing direction of the air is fixed to the outer surface of the heat-transfer tube so that the ring fins having portions on the upper side fixed to the heat-transfer tube and the ring fins having portions on the lower side fixed to the heat-transfer tube are arranged alternately along the axis of the heat-transfer tube. Therefore, heat-transfer area can be increased by a simple construction. Since the flow of air is disturbed on the upper side of the heat-transfer tubes and turbulent currents act on the heat-transfer tubes, heat exchanging quantity is increased. Since spaces are formed between the ring fins and the heat-transfer tubes at positions other than those where the ring fins and the heat-transfer tubes are in contact with each other, water droplets condensed on the heat exchanger are hardly able to stay on the heat exchanger, the heat exchanger is hardly clogged with condensed water droplets even if the surface of the heat exchanger is wet during operation, and reduction in heat exchanging quantity due to reduction in the flow of air can be suppressed.

According to the present invention, since the heat-transfer tube is inserted in one of the two loops of each of the 8-shaped ring fins formed by twisting ring fins, the twisted portions of the 8-shaped ring fins disturb the flow of the air, the flow of the air is obstructed by the ring fins positioned on the upper side and the lower side of the heat-transfer tubes, the air is unable to flow straight toward the heat-transfer tubes, the air threads it way through the spaces between the ring fins and between the ring fins and the heat-transfer tubes, and the flow velocity of the air increases and vortices are generated as the air flows through the spaces. Therefore, heat is transferred between the air and the heat exchanger at a high heat-transfer efficiency, heat transfer is promoted and heat exchanging quantity increases. Furthermore, since the spaces between the heat-transfer tubes and the ring fins are large, water droplets condensed on the heat exchanger are hardly able to stay on the heat exchanger even if the heat exchanger is used under a condition where moisture contained in the atmosphere condenses, the heat exchanger is scarcely clogged with condensed water droplets, reduction in heat exchanging quantity due to reduction in the flow of air can be suppressed and the pressure loss of air is reduced.

According to the present invention, the heat exchanger is provided with coil ring fins of a diameter greater than the outside diameter of the heat-transfer tubes, formed by helically winding fine wires around the heat-transfer tubes, the pitch of the coil ring fins is twice the diameter of the fine wire or above and portions of the inner circumferences of the coil ring fins are fixed to the outer surfaces of the heat-transfer tubes respectively. Therefore, the fins can easily be formed on the heat-transfer tubes and heat-transfer area can be increased by a simple construction. Furthermore, since the centers of the ring fins are dislocated from the axes of the heat-transfer tubes toward the upside with respect to the flowing direction of the air, the flow of air is disturbed on the upper side of the heat-transfer tubes, turbulent currents act on the heat-transfer tubes to increase heat exchanging quantity. Since spaces are formed between the ring fins and the heat-transfer tubes at positions other than those where the ring fins and the heat-transfer tubes are in contact with each other, water droplets condensed on the heat exchanger are hardly able to stay on the heat exchanger, the heat exchanger is hardly clogged with condensed water droplets even if the surface of the heat exchanger is wet during operation and reduction in heat exchanging quantity due to reduction in the flow of air can be suppressed.

According to the present invention, since the adjacent coil ring fins are fixedly joined at least at one position, the heat-transfer surface has a firm construction, the heat-transfer tubes can be arranged at reduced intervals and heat-transfer area can be increased by a simple construction. Furthermore, since the centers of the ring fins are dislocated from the center axes of the heat-transfer tubes toward the upper side with respect to the flowing direction of the air, the flow of air is disturbed on the upper side of the heat-transfer tubes and turbulent currents act on the heat-transfer tubes to increase heat exchanging quantity. Still further, since spaces are formed between the ring fins and the heat-transfer tubes at positions other than those where the ring fins and the heat-transfer tubes are in contact with each other, water droplets condensed on the heat exchanger are hardly able to stay on the heat exchanger, the heat exchanger is hardly clogged with condensed water droplets even if the surface of the heat exchanger is wet during operation and reduction in heat exchanging quantity due to reduction in the flow of air can be suppressed.

According to the present invention, since a portion of one coil ring fin on the upper side with respect to the flowing direction of the air is fixed to the outer surface of the heat-transfer tube and a portion of the other coil ring fin on the lower side with respect to the flowing direction of the air is fixed to the outer surface of the heat-transfer tube, heat-transfer area can be increased by a simple construction. Since the flow of air is disturbed on the upper side of the heat-transfer tubes and turbulent currents act on the heat-transfer tubes, heat exchanging quantity can be increased. Furthermore, since spaces are formed between the ring fins and the heat-transfer tubes at positions other than those where the ring fins and the heat-transfer tubes are in contact with each other, water droplets condensed on the heat exchanger are hardly able to stay on the heat exchanger the heat exchanger is hardly clogged with condensed water droplets even if the surface of the heat exchanger is wet during operation and reduction in heat exchanging quantity due to reduction in the flow of air can be suppressed.

According to the present invention, since the ring fins serve as heat-transfer fins and the plurality of heat-transfer tubes are fixed to the inner circumference of each ring fin, the fins can easily be fixed to the heat-transfer tubes. Thus, heat-transfer fins capable of increasing heat-transfer area by a simple construction, of increasing heat exchanging quantity, and of suppressing reduction in heat exchanging quantity due to reduction in the flow of air can easily be formed.

According to the present invention, since the plurality of heat-transfer tubes are fixed to the inner circumference of one of the loops of each of the 8-shaped ring fins, the fins can easily be fixed to the heat-transfer tubes, heat can be transferred between the air and the heat exchanger efficiently and heat transfer can be promoted. Thus, heat-transfer fins capable of preventing the clogging of the heat exchanger with condensed water droplets, of suppressing reduction in heat exchanging quantity due to reduction in the flow of air and of reducing the pressure loss of air can easily be formed.

According to the present invention, since the plurality of heat-transfer tubes are fixed to the inner circumference of each coil ring fin, fins can easily be fixed to the heat-transfer tubes. Thus, heat-transfer fins capable of increasing heat-transfer area by a simple construction, of increasing heat exchanging quantity and of suppressing reduction in heat exchanging quantity due to reduction in the flow of air can easily be formed.

According to the present invention, since portions of the inner circumferences of the ring fins are fixed to the heat-transfer tubes so that the ring fins extend obliquely downward, the draining by gravity of water droplets condensed on the heat exchanger when the heat exchanger is used under a condition where moisture contained in the atmosphere condenses is promoted, the heat exchanger is hardly clogged with condensed water droplets even if the surface of the heat exchanger is wet during operation and reduction in heat exchanging quantity due to reduction in the flow of air can be prevented.

The heat exchanger in a preferred mode of the present invention comprises the plurality of heat-transfer tubes arranged at predetermined intervals, the fine wire fins, i.e., heat-transfer fins, placed between the heat-transfer tubes so as to extend across the surfaces of the heat-transfer tubes, and needle fins inserted in spaces formed between the heat-transfer tubes and the fine wire fins, the heat-transfer surface is formed by interlacing the heat-transfer tubes as warps and the fine wire fins as wefts in a plain weave so that the intervals between the fine wire fins are at least twice the diameter of the fine wire fins or above, the needle fins are inserted in the heat-transfer surface of a plain weave perpendicularly to the heat-transfer surface, and the needle fins are fixed to the fine wire fins and/or the heat-transfer tubes. Therefore, heat-transfer area is increased and heat exchanging quantity is increase. Since spaces between the fine wire fins interlaced with the heat-transfer tubes are large, water droplets condensed on the heat exchanger are hardly able to stay on the heat exchanger even if the heat exchanger is used under a condition where moisture contained in the atmosphere condenses, the heat exchanger is hardly clogged with condensed water droplets, reduction in heat exchanging quantity due to reduction in the flow of air can be suppressed and the pressure loss of air is reduced.

According to the present invention, since the needle fins are bent in a shape resembling the inverted letter V so that the opposite ends of each needle fin face downward, the draining by gravity of water droplets condensed on the heat exchanger when the heat exchanger is used under a condition where moisture contained in the atmosphere condenses is promoted, the heat exchanger is hardly clogged with condensed water droplets even if the surface of the heat exchanger is wet during operation, and reduction in heat exchanging quantity due to reduction in the flow o air can be prevented.

According to the present invention, the heat exchanger has the plurality of heat-transfer surfaces each comprising the heat-transfer tubes and the fine wire fins and arranged in a plurality of banks, and uses a nonazeotropic cooling medium as an internal fluid to be passed through the heat-transfer tubes, and the nonazeotropic cooling medium is supplied so as to flow in directions perpendicular to the flowing direction of air from the heat-transfer surface on the lower side toward the heat-transfer surface on the upper side so that the nonazeotropic cooling medium flows in a virtually counterflow mode. Therefore, when the nonazeotropic cooling medium is used as the internal fluid, the nonazeotropic cooling medium flows in directions perpendicular to the flowing direction of air from the heat-transfer surface on the back side sequentially through the heat-transfer surfaces toward the heat-transfer surface on the upper side in a virtually counterflow mode, which improves the performance of the heat exchanger.

According to the present invention, since the heat-transfer tubes and the fine wire fins are bonded together by melting a metal film formed by plating and solidifying the molten metal film, the thermal resistance of the junctions of the heat-transfer tubes and the fine wire fins is reduced, heat-transfer efficiency is enhanced and heat exchanging efficiency is enhanced.

According to the present invention, in the heat exchanger formed by interlacing the heat-transfer tubes and the fine wire fins, since the heat-transfer tubes and the fine wire fins are bonded together by melting a metal film formed by plating and solidifying the molten metal film, the thermal resistance of the junctions of the heat-transfer tubes and the fine wire fins is reduced, heat-transfer efficiency is enhanced and heat exchanging efficiency is enhanced.

According to the present invention, in the heat exchanger formed by arranging a metal gauze composed of the fine wire fins on the front and rear surfaces of the heat-transfer tubes, since the heat-transfer tubes and the fine wire fins are bonded together by melting a metal film formed by plating and solidifying the molten metal film, the thermal resistance of the junctions of the heat-transfer tubes and the fine wire fins is reduced, heat-transfer efficiency is enhanced, heat exchanging efficiency is enhanced and the heat exchanger can be manufactured at a reduced cost.

According to the present invention, since the metal gauze is passed alternately over and under the heat-transfer tubes, heat exchanging efficiency can be improved even with a single metal gauze.

According to the present invention, since at least either the outer surfaces of the heat-transfer tubes or the outer surfaces of the fine wire fins are coated with a metal film by plating, the heat-transfer tubes and the fine wire fins are interlaced to form a woven structure, and the woven structure is heated to the melting point of the metal film to melt the metal film partly so that the heat-transfer tubes and the fine wire fins are bonded together by the melted and solidified metal film. Therefore, the thickness of the metal film can be determined by regulating the plating time so that the spaces between the fine wire fins may not be clogged with the surplus bonding material, and the heat-transfer tubes and the fine wire fins can precisely be bonded together. Accordingly, the thermal resistance of the junctions of the heat-transfer tubes and the fine wire fins can be reduced to enhance heat exchanging efficiency.

According to the present invention, the components are Ni-plated and the Ni film is suitable for bonding together the corresponding materials.

According to the present invention, the components are solder-plated and the solder film is suitable for bonding together corresponding materials.

According to the present invention, since the bar fins are inserted alternately in spaces between the heat-transfer tubes, air blown against the heat exchanger threads its way through spaces between the fine wire fins and the heat-transfer tubes, the flow velocity of air increases and vortices are generated as air flows through the spaces, and the flow of air is disturbed to promote heat transfer and to enhance heat exchanging efficiency. Since the length of the fins can optionally be determined, surface area of the fins can be increased and a necessary heat-transfer area can easily be secured.

According to the present invention, since the heat exchanger is provided with further heat-transfer tubes, the heat-transfer efficiency is further improved by the improvement of fin efficiency and the like and hence heat exchanging efficiency is enhanced.

According to the present invention, since a plurality of lattices each having rhombic spaces are formed by arranging the bar fins, the plurality of lattices are stacked to form a lattice structure, and the heat-transfer tubes forming flow passages for the cooling medium are inserted in the spaces in the lattice structure so as to be in close contact with the lattices, heat exchanging efficiency is enhanced and the heat exchanger can easily be fabricated.

According to the present invention, since the U-shaped or H-shaped fins are attached to the heat-transfer tubes, heat exchanging efficiency can be enhanced. Since the size of the fins can optionally be determined, a necessary heat-transfer area can easily be secured.

According to the present invention, the ring fins enhances heat exchanging efficiency, and a desired heat-transfer area can optionally be secured by changing the size of the ring fins.

According to the present invention, since the heat-transfer tubes are inserted in spaces defined by the overlapping portions of the ring fins, heat-transfer area can be increased without deteriorating heat transfer promoting effect and heat exchanging efficiency can be enhanced. Furthermore, since the fine wire fins are stretched by increasing the intervals between the heat-transfer tubes, the heat-transfer tubes and the fins can be held in satisfactory thermal contact with each other and the pitch of the heat-transfer tubes can be fixed.

According to the present invention, since the fine wire fins are attached to the heat-transfer tubes, the fine wire fins enhances heat exchanging efficiency, and a necessary heat-transfer area can be secured by properly determining the length of the fine wire fins.

According to the present invention, since the free ends of the fins extend downward from a horizontal plane, condensed water droplets are able to drain off easily, the air passages are relieved of clogging with condensed water droplets, heat transfer promoting effect can be maintained and hence heat exchanging efficiency is enhanced.

According to the present invention, since the fine wire fins and the heat-transfer tubes are formed of different materials differing from each other in contact angle respectively, condensed water droplets are able to drain off easily, water droplets are hardly able to stay in spaces between the fins, the heat-transfer ability is maintained even if water droplets condense on the heat exchanger and hence heat exchanging efficiency is enhanced.

According to the present invention, since the fine wire fins are wound around the support bars spaced apart from the heat-transfer tubes, the fine wire fins cross each other at a large crossing angle. Therefore, water droplets are less liable to stay in spaces between the fins, the heat exchanger is hardly clogged with water droplets even if the surface of the heat exchanger is wet during operation, reduction in heat exchanging quantity due to reduction in the flow of air can be controlled and hence heat exchanging efficiency is enhanced.

According to the present invention, since additional heat-transfer tubes are used as the support bars, fine efficiency of the fine wire fins is improved, heat transfer is promoted and heat exchanging efficiency is enhanced.

According to the present invention, since the support bars are fixed to the headers, the fine wire fins have strength sufficient to withstand tension.

According to the present invention, since the heat exchanger is provided with the additional heat-transfer tubes and the support bars, the fine wire fins cross each other at a large crossing angle, water droplets are hardly able to stay on the heat exchanger, the heat exchanger is hardly clogged with water droplets even if the surface of the heat exchanger is wet during operation, reduction in heat exchanging quantity due to reduction in the flow of air can be suppressed and hence heat exchanging efficiency is enhanced. Furthermore, the support bars fix the pitch of the heat-transfer tubes and strengthen the structure.

According to the present invention, since the fine wire fins are passed alternately over one heat-transfer tube and under a suitable number of heat-transfer tubes, the fine wire fins cross each other at a reduced number of crossing points, a reduced quantity of water droplets is held, the heat exchanger is hardly clogged with water droplets even if the surface of the heat exchanger is wet during operation, reduction in heat exchanging quantity due to reduction in the flow of air can be suppressed and hence heat exchanging efficiency is enhanced.

According to the present invention, since the heat-transfer tubes are flat tubes, the fine wire fins are wound around the heat-transfer tubes at a large angle of contact, water droplets are hardly able to stay on the heat exchanger, the heat exchanger is hardly clogged with water droplets even if the surface of the heat exchanger is wet during operation, reduction in heat exchanging quantity due to reduction in the flow of air can be suppressed and hence heat exchanging efficiency is enhanced.

According to the present invention, since the fine wire fins are stretched, the fine wire fins are in close contact with the heat-transfer tubes, thermal resistance at the contact points is reduced and hence heat exchanging efficiency is enhanced.

According to the present invention, since the heat-transfer tubes are formed of a soft material, and the fine wire fins are stretched to form depressions in the heat-transfer tubes so that the fine wire fins are in close contact with the heat-transfer tubes, thermal resistance at the contact points between the fine wire fins and the heat-transfer tubes is reduce, heat transfer within the heat-transfer tubes is promoted and hence heat exchanging efficiency is enhanced.

According to the present invention, since the heat-transfer tubes are provided with recesses in their outer circumferences, the fine wire fins can easily be fixed to the heat-transfer tubes, thermal resistance at the contact points between the heat-transfer tubes and the fine wire fins is reduced and hence heat exchanging efficiency is enhanced.

According to the present invention, since the heat-transfer surface is formed in a wavy shape, the ratio of the heat-transfer area to the frontal area is increased and hence heat exchanging efficiency is enhanced.

According to the present invention, since the heat-transfer surface is formed in a semicircular shape, the ratio of the heat-transfer area to the frontal area is increased and hence heat exchanging efficiency is enhanced.

According to the present invention, since the heat exchanger comprises a plate-fin-tube heat exchanging unit and a wire-fin-tube heat exchanging unit, which are disposed one behind the other, the ratio of the heat-transfer area to the frontal area of the heat exchanger is greater than that of a heat exchanger comprising two wire-fin-tube heat exchanging units arranged in two banks. Furthermore, when the heat exchanger is used under a condition where moisture contained in the atmosphere condenses, most part of the moisture is caused to condense on the plate fins of the heat exchanging unit disposed on the upper side to suppress the clogging of the heat exchanging unit disposed on the lower side with water droplets, reduction in heat exchanging quantity due to reduction in the flow of air can be suppressed and hence heat exchanging efficiency is enhanced.

According to the present invention, since the heat exchanger comprises the corrugated-fin-tube heat exchanging unit and the wire-fin-tube heat exchanging unit, which are disposed one behind the other, the ratio of the heat-transfer area to the frontal area of the heat exchanger is greater than that of a heat exchanger comprising two wire-fin-tube heat exchanging units. Furthermore, when the heat exchanger is used under a condition where moisture contained in the atmosphere condenses, the moisture is caused condense mainly on the corrugated fins of the heat exchanging unit disposed on the upper side to suppress the clogging of the heat exchanging unit disposed on the lower side with condensed water droplets, reduction in heat exchanging quantity due to reduction in the flow of air can be suppressed and hence heat exchanging efficiency is enhanced.

According to the present invention, since the heat exchanger comprises the plate-fin-tube heat exchanging unit and the wire-fin-tube heat exchanging unit, which are disposed one behind the other, the ratio of the heat-transfer area to the frontal area of the heat exchanger is greater than that of a heat exchanger comprising two wire-fin-tube heat exchanging units. Furthermore, when the heat exchanger is used under a condition where moisture contained in the atmosphere condenses, the moisture is caused to condense mainly on the corrugated fins of the heat exchanging unit disposed on the upper side to suppress the clogging of the heat exchanging unit disposed on the lower side with condensed water droplets, reduction in heat exchanging quantity due to reduction in the flow of air can be suppressed and hence heat exchanging efficiency is enhanced.

Although the invention has been described in its preferred forms, various modifications are possible without departing from the scope and spirit of the present invention. It is therefore to be understood that the invention is not limited to the embodiments thereof specifically described herein except as defined in the appended claims.

What is claimed is:

1. A heat exchanger comprising:
    a plurality of heat-transfer tubes arranged in parallel to each other at predetermined intervals, the heat-transfer tubes are divided into groups of two adjacent heat-transfer tubes, each group having a common tube with each adjacent group; and
    a plurality of fine wire fins serving as heat-transfer fins, at least one of the fine wire fins being wound helically around two adjacent heat-transfer tubes of each group so that a fine wire fin wound around one group of tubes does not cross portions of another fine wire fin wound around another group and does not cross other portions of the same fine wire fin wound around the same group.

2. A heat exchanger, according to claim 1, wherein a cross section of the fine wire fins has a polygonal shape, including shapes of concave polygons.

3. A heat transfer exchanger as in claim 1, wherein the axes of the tubes define a surface having a front side and a rear side, each group of tubes are helically wound with two fins which are wound on an angle and in the same direction and are spaced from each other to contact the tubes at different points.

4. A heat transfer exchanger as in claim 3, wherein adjacent groups of tubes have fins which are wound in different directions so that none of the fins contact the tubes on the same point.

5. A heat transfer exchanger as in claim 3, wherein odd numbered groups have fins which are wound on a first angle and even numbered groups have fins which are wound on a second angle, different than the first angle.

6. A heat exchanger according to claim 1, wherein the plurality of heat-transfer tubes include a first and a second set of heat-transfer tubes, each set having a heat-transfer surface including the axes of the heat-transfer tubes, the heat-transfer surface of each set being bent at locations of the tubes to form a zigzag shape having ridges and furrows, the first set being disposed behind the second set so that the ridges of the first set protrude into the furrows of the second set, wherein the heat-transfer surfaces are substantially perpendicular to a flowing direction of an external fluid that flows through the heat-transfer surfaces, outside the heat-transfer tubes.

7. A heat exchanger according to claim 1, wherein the plurality of heat-transfer tubes include a first and a second set of heat-transfer tubes, each set of tubes having a heat-transfer surface including the axes of the tubes, the sets are arranged to have their surfaces parallel to each other, the surfaces being substantially perpendicular to the flowing direction of an external fluid that flows through the surfaces outside the heat-transfer tubes, the sets being connected to each other such that a cooling medium which flows in the tubes flows from the first set of tubes, disposed downstream with respect to the flowing direction of the external fluid, sequentially through intermediate sets of tubes to the last set, disposed upstream with respect to the flowing direction of the external fluid.

8. A heat exchanger according to claim 1, wherein said heat exchanger is utilized for an air conditioner.

* * * * *